(12) United States Patent
IJntema et al.

(10) Patent No.: US 11,470,620 B2
(45) Date of Patent: Oct. 11, 2022

(54) DYNAMIC SLICE PRIORITY HANDLING

(71) Applicants: Koninklijke KPN N.V., Rotterdam (NL); NEDERLANDSE ORGANISATIE VOOR TOEGEPAST-NATUURWETENSCHAPPELIJK ONDERZOEK TNO, 's-Gravenhage (NL)

(72) Inventors: Wieger IJntema, Rotterdam (NL); Pieter Nooren, Delft (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

(*) Notice: Subject to any disclaimer, the term of this patent is extended or adjusted under 35 U.S.C. 154(b) by 0 days.

(21) Appl. No.: 17/281,529

(22) PCT Filed: Oct. 11, 2019

(86) PCT No.: PCT/EP2019/077560
§ 371 (c)(1),
(2) Date: Mar. 30, 2021

(87) PCT Pub. No.: WO2020/074687
PCT Pub. Date: Apr. 16, 2020

(65) Prior Publication Data
US 2021/0345357 A1    Nov. 4, 2021

Related U.S. Application Data

(60) Provisional application No. 62/744,439, filed on Oct. 11, 2018.

(30) Foreign Application Priority Data

Nov. 14, 2018  (EP) .................................... 18206310

(51) Int. Cl.
H04W 72/10    (2009.01)

(52) U.S. Cl.
CPC .................................. *H04W 72/10* (2013.01)

(58) Field of Classification Search
CPC ...... H04W 72/10; H04L 45/42; H04L 47/781; H04L 45/64
See application file for complete search history.

(56) References Cited

U.S. PATENT DOCUMENTS

| 10,440,642 B2 | 10/2019 | Zait |
| 2011/0249685 A1 | 10/2011 | Liang |

(Continued)

FOREIGN PATENT DOCUMENTS

| CN | 101547150 A | 9/2009 |
| CN | 106922002 A | 4/2017 |

(Continued)

OTHER PUBLICATIONS

3GPP TR 28.801; Technical Specification Group Services and System Aspects; Telecommunication management; Study on management and orchestration of network slicing for next generation network (Release 15), pp. 1-75: V15.1.0(5SA WG5) (Jan. 4, 2018).

(Continued)

*Primary Examiner* — Dinh Nguyen
(74) *Attorney, Agent, or Firm* — Hamilton, Brook, Smith & Reynolds, P.C.

(57) ABSTRACT

Embodiments provide functionality for dynamic handling of network slice priorities. In an embodiment, a slice priority manager receives, from a network services node, data indicating changes in network resources available for maintaining instantiated network slices in a communication network. Based on the received data, changes in the network services node's ability to maintain the instantiated network slices are identified and a communication service provider is notified (Continued)

of the change. To continue, slice priority data that indicates a preferred order of a portion of the network slices for allocating the network resources is received from the communication service provider. In turn, an indication of the slice priority data is forwarded to the network services node to update allocation of network resources for the slices.

15 Claims, 16 Drawing Sheets

(56) References Cited

U.S. PATENT DOCUMENTS

| | | | | |
|---|---|---|---|---|
| 2013/0339495 | A1* | 12/2013 | Mower | H04L 41/0803 709/220 |
| 2016/0352924 | A1* | 12/2016 | Senarath | H04M 15/66 |
| 2017/0086118 | A1* | 3/2017 | Vrzic | H04W 36/26 |
| 2018/0123878 | A1* | 5/2018 | Li | H04L 41/0803 |
| 2018/0131578 | A1* | 5/2018 | Cui | H04L 47/70 |
| 2018/0132138 | A1* | 5/2018 | Senarath | H04L 47/78 |
| 2018/0139129 | A1* | 5/2018 | Dowlatkhah | H04L 45/306 |
| 2018/0199279 | A1* | 7/2018 | Baek | H04W 72/02 |
| 2018/0220276 | A1 | 8/2018 | Senarath et al. | |
| 2018/0260200 | A1 | 9/2018 | Karagiannis et al. | |
| 2018/0316627 | A1 | 11/2018 | Cui et al. | |
| 2019/0357129 | A1 | 11/2019 | Park et al. | |

FOREIGN PATENT DOCUMENTS

| | | |
|---|---|---|
| CN | 107743100 A | 2/2018 |
| CN | 108270823 A | 7/2018 |
| CN | 108293004 A | 7/2018 |
| CN | 108566659 A | 9/2018 |
| WO | WO 2019/160390 A1 | 8/2019 |
| WO | WO 2021/122516 A1 | 6/2021 |

OTHER PUBLICATIONS

China Telecom et al: "Discussion on network slice priority", 3GPP Draft; S5-185607 Discussion on Network Slice Priority, 3rd Generation Partnership Project, Aug. 20, 2018-Aug. 24, 2018: SA WG5 (Aug. 24, 2018).
Huawei, "Add use case and requirement for network slice instance priority", 3GPP Draft; S5-175111 PCR 28 530 Add Use Case and Requirement for Network Slice Instance Priority, 3rd Generation Partnership Project (3GPP), Oct. 16, 2017-Oct. 20, 2017: F-069(SA WG5) (Oct. 15, 2017).
International Search Report and Written Opinion dated Jan. 13, 2020, for International Application No. PCT/EP2019/077560, entitled: "Dynamic Slice Priority Handling," filed Oct. 11, 2019.
3GPP TS 28.530, "Management and orchestration; Concepts, use cases and requirements," 3GPP, Sep. 2018.
3GPP TS 28.533, "Management and orchestration; Architecture framework," 3GPP, Sep. 2018.
ETSI, "GS NFV-MAN 001—Network Functions Virtualisation (NFV); Management and Orchestration," Dec. 2012.
Qualcomm Incorporated: "(TP for NR BL CR for TS 38.413): General Fallback", 3GPP Draft; R3-184685 General Fallback, Aug. 11, 2018.
3rd Generation Partnership Project (3GPP) TS 23.501 V16.2.0 (Sep. 2019), Technical Specification, 3rd Generation Partnership Project: Technical Specification Group Services and System Aspects; System Architecture for the 5G System (5GS); Stage 2 (Release 16).
3GPP TS 23.502 V16.2.0 (Sep. 2019), Technical Specification, 3rd Generation Partnership Project: Technical Specification Group Services and System Aspects; Procedures for the 5G System (5GS); Stage 2 (Release 16).

* cited by examiner

DYNAMIC SLICE PRIORITY HANDLING

This application is the U.S. National Stage of International Application No. PCT/EP2019/077560, filed Oct. 11, 2019, published in English, which claims the benefit of U.S. Provisional Application No. 62/744,439, filed Oct. 11, 2018 and claims priority under 35 U.S.C. § 119 or 365 to European Application No. 18206310.7, filed Nov. 11, 2018. The entire teachings of the above applications are incorporated herein by reference.

FIELD OF THE INVENTION

The invention relates to a network node, a communications network and a method for managing slide priorities.

BACKGROUND

Next generation network architectures, such as 5G, may separate network functions from the underlying hardware resources, e.g., in the case of a telecommunication network, the network nodes of the network. For that purpose, so-called Network Virtualization (NV) techniques may be used, and, in particular, Network Function Virtualization (NFV) techniques which provide network functions that are instantiable in software using the hardware of one or more of the network nodes. Herein, "providing" or "establishing" a network function may thus comprise or refer to the instantiation of a network function in a network.

Such next generation network architectures may further define virtual data planes which separate data traffic in the network. Such virtual data planes, which may be established by a Software-Defined Network (SDN) but also by other techniques, may include a management plane to enable transmissions of management data in the network, a control plane to enable transmission of control data in the network, and a user plane to enable transmission of user data to and/or from User Equipment (UE) connected to the network. The user plane may also be referred to simply as the "data plane."

Next generation network architectures, such as the architecture described in 3GPP TS 28.530, "Management and orchestration; Concepts, use cases and requirements," 3GPP, September 2018, creates isolated network slices inside the mobile operator domain. These slices can be tailored for specific services and functionalities. In this approach, the infrastructure of a mobile operator supports multiple network slices. In 3GPP TS 28.530, the requirements state that the 3GPP management system has the capability of re-allocating resources of a Network Slice Instance (NSI) according to a priority.

SUMMARY

While priorities are contemplated by 3GPP TS 28.530 requirements, these priorities are static and there is no existing functionality for dynamically managing network slice priorities. Embodiments based on the present disclosure provide a new way to handle priorities of different virtual network slices that are provided on a physical network in the event there is a lack of network resources, for example, in the case of network failure, or if there is an abundance of network resources. Instead of using static priorities, as is done in the approach currently developed in 3GPP, embodiments make the definition of the priorities in the network slicing management functions dynamic, based on interactions between the network operator (NOP) and the communication service providers (CSPs) that use the slices for their services. In embodiments, the information flows between the NOP and the CSPs and the decisions on slice priorities may be provided by a new function, a Slice Priority Manager. An embodiment builds on the network-level implementation of priorities currently under development for the network functions virtualization management and orchestration (NFV-MANO) architecture.

Embodiments improve the ability for CSPs to provide end users an uninterrupted and high-quality service experience by reducing the number of network slice de-instantiations. Further, in the event capacity reductions are still needed, e.g., a slice is de-instantiated, the capacity reductions may be applied to the network slices according to preferences provided by the CSPs themselves. For example, a CSP may prefer capacity reductions where the negative consequences for its end users are the smallest.

An example embodiment for providing network slice priority handling may be directed to a network node configured as a slice priority management node for use with a communication network. The network node may be configured to receive, from a network services node, data indicating changes in network resources available for maintaining instantiated network slices in the communication network, where the network services node may be configured to enable the instantiation of the network slices, each representing a virtual network. In an embodiment, the data indicating changes may be any such data that indicates an influence on the ability to maintain a network slice. Based on the received data, the network node may identify a change in the network services node's ability to maintain the instantiated network slices and notify a communication service provider of the change. In turn, the network node may receive, from the communication service provider, slice priority data that indicates a preferred order of a portion of the network slices for allocating the network resources. In response, the network node may forward an indication of the slice priority data to the network services node.

According to an example embodiment, the indication of the slice priority data may include at least one of the slice priority data and instructions to remove a given network slice of the instantiated network slices. In another embodiment, the data received from the network services node at the network node may indicate a lack of resources for maintaining the instantiated network slices or an abundance of resources for maintaining the instantiated network slices. According to an embodiment, the network node may further be configured, in response to receiving the slice priority data from the communication service provider, to determine if changing allocation of network resources based on the slice priority data corrects a resource problem and, if changing the allocation of network resources based on the slice priority data does not correct the resource problem, notify the communication service provider. In such an embodiment, the network node may be configured to determine if changing the allocation of the network resources based on the slice priority data corrects the resource problem based upon at least one of: connectivity capacity data, storage capacity data, and processing capacity data. According to an embodiment, at least one of the connectivity capacity data, the storage capacity data, and the processing capacity data may include at least one of: base capacity data, maximum guaranteed capacity data, and maximum non-guaranteed capacity data.

An example embodiment of the network node may further be configured to notify the communication service provider of the change via an exposure function. Moreover, in another example embodiment of the network node, the data indicating changes in network resources may be pushed to the network node from the network services node or received in response to a request from the network node to the network services node. Yet another embodiment of the network node may be configured to receive data indicating available network resources from a transport network system.

According to yet another embodiment, the network node may be configured, in identifying a change in the network services node's ability to maintain the instantiated network slices, to determine there are insufficient resources available to maintain a slice associated with the communication service provider and only notify the communication service provider of the change in the network services node's ability to maintain the instantiated network slices if it is determined there are insufficient resources available to maintain the slice associated with the communication service provider. In such an embodiment, a communication service provider is only notified of the change, if the change affects one of the communication service provider's slices. According to an embodiment, the network node may be configured to determine there are insufficient resources available to maintain the slice based upon any data that influences maintaining a slice. For instance, in an example embodiment, the network node may be configured to determine there are insufficient resources available to maintain the slice associated with the communication service provider based upon at least one of: connectivity capacity data, storage capacity data, and processing capacity data. According to one such embodiment, at least one of the connectivity capacity data, the storage capacity data, and the processing capacity data may include at least one of: base capacity data, maximum guaranteed capacity data, and maximum non-guaranteed capacity data.

Another embodiment of the network node may be configured to provide priority handling at the subnet slice level of granularity. In such an embodiment, the data indicating changes in network resources available for maintaining instantiated network slices may include location information or subnet slice identifiers, where the location information and subnet slice identifiers may indicate changes in network resources available to maintain instantiated subnet slices forming the network slices. Further, the network node may be configured to provide the location information or the subnet slice identifiers to the communication service provider, receive subnet slice priority data from the communication service provider, and forward an indication of the subnet slice priority data to the network services node. In this way, the communication service provider is made aware of changes in maintaining slices for particular geographic areas that are covered by particular subnet slices and the communication service provider provides its preferred priority for allocating resources to the subnet slices/geographic areas. Then, by forwarding an indication of the communication service provider's subnet preferences to the network services node, the network services node can implement the subnet preferences.

Yet another embodiment of the network node may be configured, in notifying the communication service provider of the change, to indicate an order with which slices associated with the communication service provider will be allocated resources by the network services node. In one such embodiment, the network node may be configured to indicate the order using a mapping that numerically decouples priority indicators used by the network services node from priority indicators used by the communication service provider. In this way, the communication service provider is not notified of the priority with which slices associated with the communication service provider will be allocated resources as compared to network slices not associated with the communication service provider.

Another example embodiment of the network node may be configured to store default slice priority data associated with the communication service provider and forward the default slice priority data to the network services node if the slice priority data is not received from the communication service provider.

In accordance with another embodiment, the network node may be configured to determine a proposed slice priority and provide the proposed slice priority to the communication service provider. According to such an embodiment, the network node may be configured to determine the proposed slice priority based upon at least one of historical data, current resource usage data, and machine learning analysis of resource usage data.

An embodiment of the network node may be configured to provide network slice priority handling for multiple communication service providers. In such an embodiment, the network node may further be configured to notify a second communication service provider of the change, receive slice priority data from the second communication service provider that indicates a preferred order of a second portion of the network slices for allocating the network resources, and forward an indication of the slice priority data received from the second communication service provider to the network services node.

In an embodiment where the network node provides slice priority handling for multiple communication service providers, the network node may be further configured to determine if changing allocation of network resources based on the slice priority data received from the first communication service provider and the slice priority data received from the second communication service provider corrects a resource problem and, if changing the allocation of network resources based on the slice priority data received from the first communication service provider and the second communication service provider does not correct the resource problem, notify the first communication service provider and the second communication service provider.

Another embodiment is directed to a communication network comprising a plurality of network nodes, where the network is configured to enable instantiation of network slices which represent virtual networks. The communication network may comprise a slice priority management function configured to receive, from a network services node, data indicating changes in network resources available for maintaining instantiated network slices in the communication network, where the network services node is configured to enable the instantiation of the network slices that each represent a virtual network. The slice priority management function in the communication network may further be configured to identify a change in the network services node's ability to maintain the instantiated network slices based on the received data, notify a communication service provider of the change, and receive, from the communication service provider, slice priority data that indicates a preferred order of a portion of the network slices for allocating the network resources. Further, the slice priority management function may forward an indication of the slice priority data to the network services node.

Yet another embodiment is directed to a method for managing slice priority in a communication network. Such a method embodiment may begin by receiving, from a network services node, data indicating changes in network resources available for maintaining instantiated network slices in the communication network where, the network services node imay be configured to enable the instantiation of the network slices that each represent a virtual network. The method may continue by identifying a change in the network services node's ability to maintain the instantiated network slices based on the received data and notifying a communication service provider of the change. In turn, slice priority data may be received from the communication service provider and an indication of the slice priority data may be forwarded to the network services node.

In accordance with another aspect of the disclosure, a non-transitory computer readable medium may be provided comprising a computer program that comprises instructions for causing a processor system to provide slice priority handling. According to such an embodiment, the instructions may cause the processor system to receive, from a network services node (configured to enable the instantiation of the network slices each representing a virtual network), data indicating changes in network resources available for maintaining instantiated network slices in the communication network. Further, the instructions may cause the processor system to, based on the received data, identify a change in the network services node's ability to maintain the instantiated network slices and notify a communication service provider of the change. The instructions also may cause the processor system to receive, from the communication service provider, slice priority data indicating a preferred order of a portion of the network slices for allocating the network resources and forward an indication of the slice priority data to the network services node.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

Figure 1:
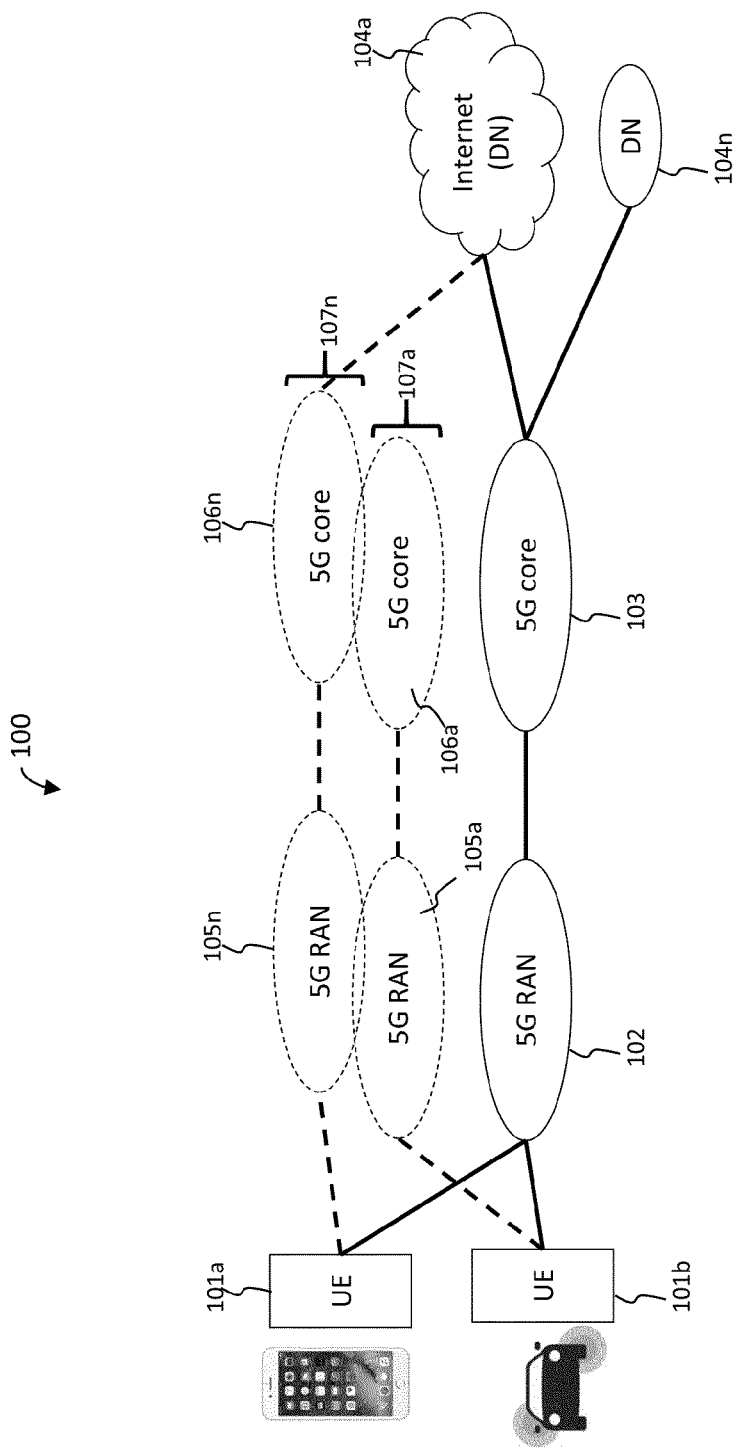
FIG. 1 depicts a network including slices in which an embodiment may be implemented.

Embodiments provide dynamic priority handling for network slices. FIG. 1 depicts a network 100 in which embodiments may be employed. The network 100 includes the user equipment devices 101a and 101b which are a phone and a car, respectively. The network 100 is implemented by the physical components which include the 5G radio access network 102 which is connected to the 5G core network 103. The 5G core network 103 is coupled to any number of data networks 104a and 104n. Through the radio access network 102 and core network 103, the user equipment devices 101a and 101b are able to connect to the data networks 104a-n.

The network 100 includes the virtualized networks, called network slices, 107a and 107n. The network slice 107a comprises the virtualized 5G radio access network 105a and virtualized 5G core network 106a and the network slice 107n comprises the virtualized 5G radio access network 105n and virtualized 5G core network 106n. The slices 107a-n, 5G radio access networks 105a-n, and 5G core networks 107a-n are instantiated using the physical components 102 and 103. In the network 100, the network slices 107a and 107n each represent a virtual network that provides connectivity, processing, and storage services, amongst other services, to the user equipment devices 101a and 101b. Embodiments can be employed in the network 100 to control allocation of network resources for maintaining the instantiated slices 107a-n. In an implementation, an embodiment may be provided as a slice priority management function operating in a management plane of the network 100.

In networks with multiple network slice instances (NSIs), i.e., slices, each slice can have a different priority. Therefore, network traffic in low priority slices will be affected when the infrastructure of the operator is not able to accommodate all of the slices.

Figure 2:
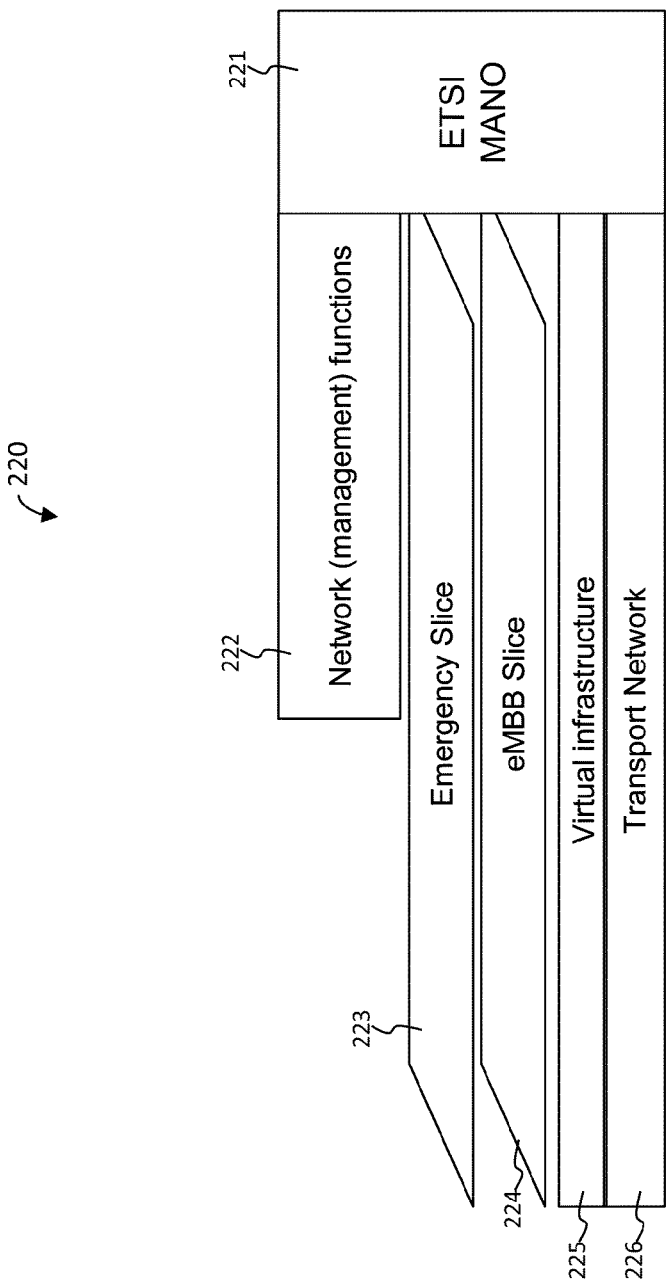
FIG. 2 illustrates a network with sufficient resources for implementing slices.

FIG. 2 illustrates a network 220 during normal operation. In the network 220, the operator, in this example, European Telecommunications Standards Institute Management and Orchestration node, i.e., network services node, 221 communicates with the transport network 226, which could be part of the Network Function Virtualization Infrastructure and the network services node 221 communicates with the virtual infrastructure layer 225 which is part of the Network Function Virtualization Infrastructure (NFVI). The layers 225 and 226 form the NFVI. The NFVI is the environment in which virtual network functions run. The NFVI environment includes physical resources (not shown), virtual resources, e.g., the emergency slice 223 and the enhanced mobile broadband (eMBB) slice 224, and a virtualization layer, e.g., the virtual infrastructure 225.

To elaborate, computing, memory, and networking resources are the physical parts in NFVI. Virtual resources are instantiated on these physical resources. Any commodity network switch, which is part of the transport network 226 or physical server, storage server, or the like, comprise the physical parts in NFVI. Virtual resources include virtual computing, memory, and networking resources, e.g., the slices 223 and 224, that are utilized by virtual network functions, e.g., the functions 222. The virtualization layer 225 is responsible for abstracting physical resources into virtual resources. The virtualization layer may be referred to as a "Hypervisor." The virtualization layer 225 decouples software from hardware which enables the software to progress independently from hardware.

The network services node 221 uses the virtual infrastructure layer 225 to instantiate the eMBB slice 224 and the emergency slice 223, which are just two example slices, amongst others, that may be instantiated in the network 220. Further, the network 220 includes the management functions 222. The management functions 222 include any functions, e.g., management functions that operate on multiple slices. In FIG. 2 normal operation for all slices, 224 and 223, is shown.

Figure 3:
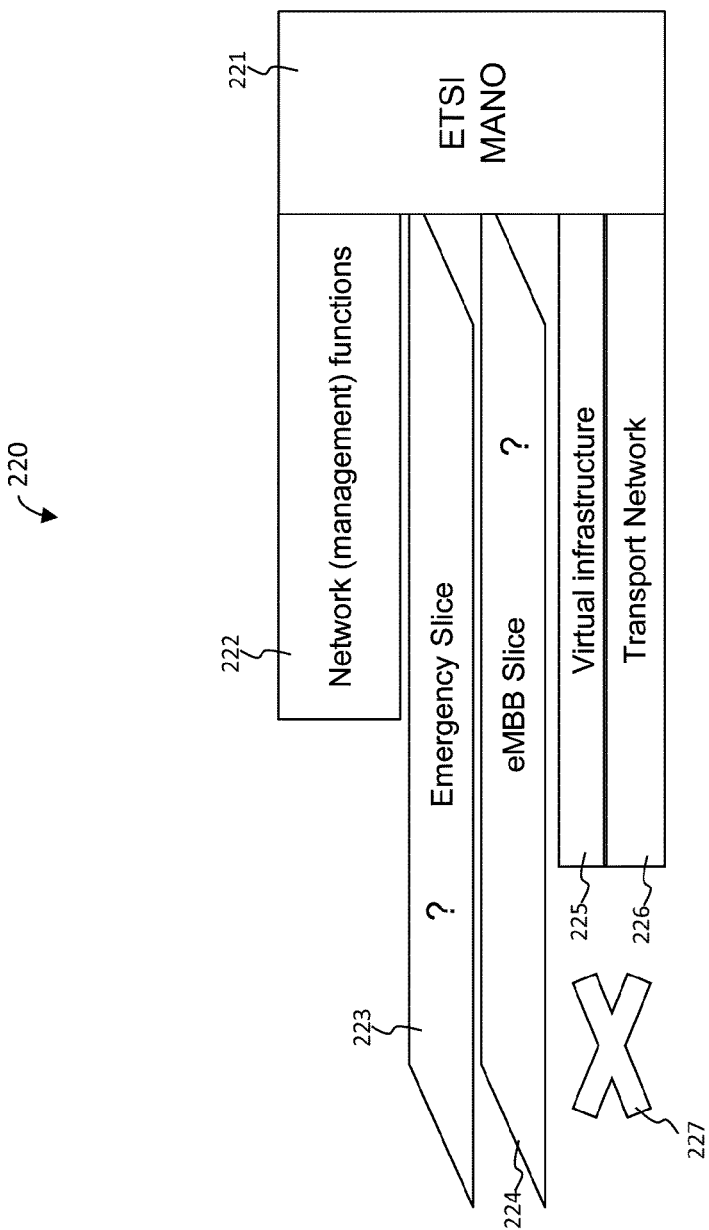
FIG. 3 illustrates a network with insufficient resources for maintaining instantiated slices in which an embodiment may be implemented.

FIG. 3 depicts the network 220 after an event 227, such as the instantiation of a new slice or the failure of some elements of the network infrastructure, which causes a capacity shortage for the network infrastructure, to accommodate all slices. According to 3GPP requirements, in such situations, slices with higher priority will take over resources from lower priority slices. This may result in other slices being de-instantiated from the network infrastructure.

Figure 4:
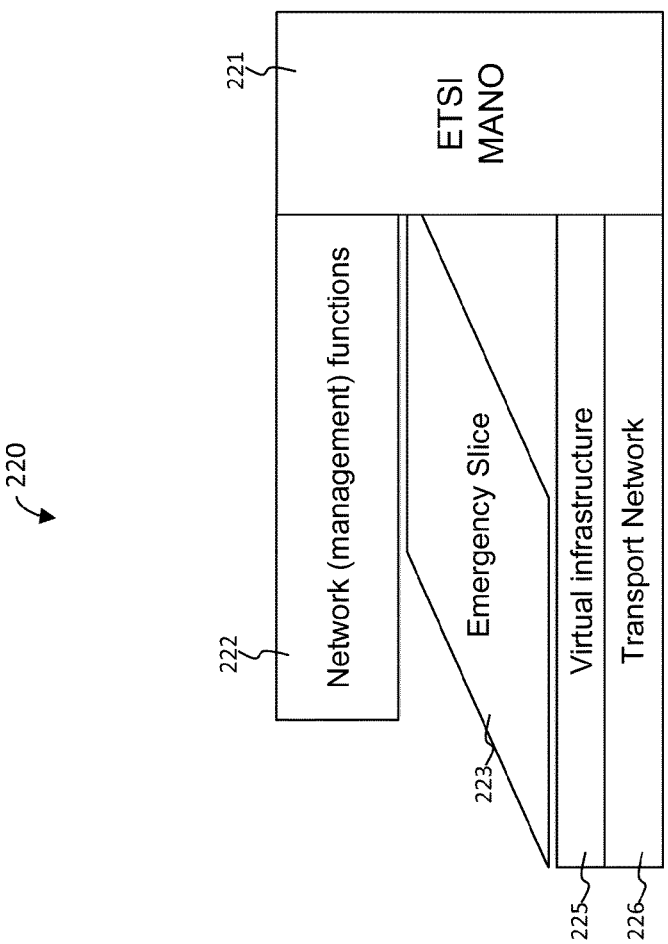
FIG. 4 illustrates a network with slices configured after re-allocation of network resources according to principles of an embodiment.

FIG. 4 illustrates the network 220 where a lack of capacity is solved by re-allocating resources to the higher priority slice, the emergency slice 223. Existing methods perform this re-allocation based on a static priority, however, at the time of the event 227, the static priority may no longer be desired, but, existing methods do not accommodate a change in priority. In contrast, embodiments described herein facilitate dynamic setting of resource priorities for maintaining slices and, thus, when an event occurs, such as a failure or abundance of resources, the resources can be allocated according to priorities that are determined at the time of the event based on the current conditions of the network and desired preferences of communication service providers.

Figure 5:
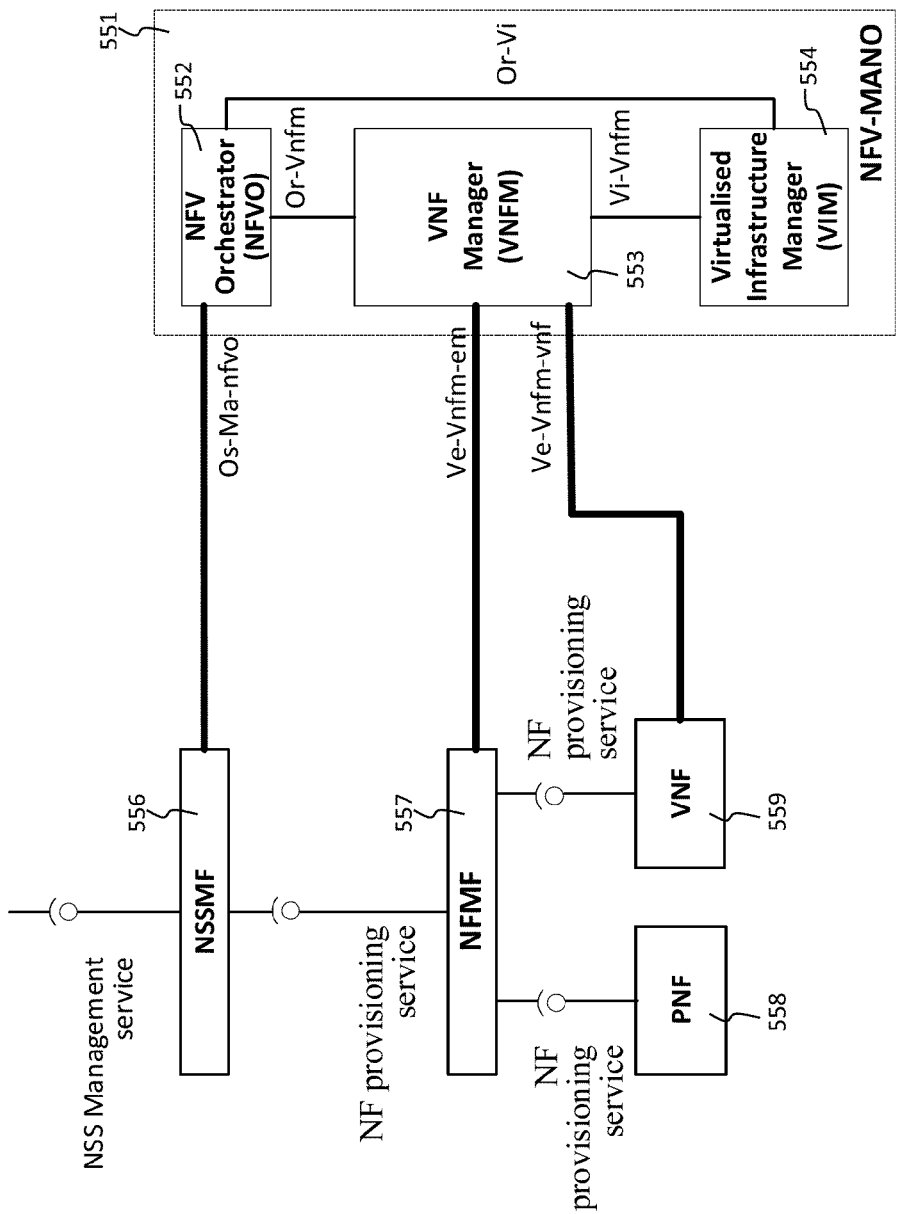
FIG. 5 depicts interactions between slice management functions and a network services node in which an embodiment may be implemented.

FIG. 5 depicts an example of a deployment scenario of how functions can interact with the NFV-MANO functions 551. It is noted that the deployment scenario depicted in FIG. 5 is but one example and functions can be named differently and be configured to perform different functionalities. In an example, functions that interact with the NFV-MANO functions 551 may be any such functions as described in 3GPP TS 28.533, "Management and orchestration; Architecture framework," 3GPP, September 2018. Further, the NFV-MANO functions 551 may include any such functions as described in ETSI, "GS NFV-MAN 001—Network Functions Virtualisation (NFV); Management and Orchestration," December 2012.

Returning to FIG. 5, in this deployment scenario the functions that interact with the NFV-MANO functions 551 include the network slice subnet management function (NSSMF) 556, network function management function (NFMF) 557, physical network function (PNF) 558, and virtualized network function (VNF) 559. The NSSMF 556 is capable of consuming the virtual network function (VNF) life cycle management (LCM) and the network service life cycle management related services provided by NFV-MANO. The NSSMF 556 is also a provider of network slice subnet related services. The NFMF 557 provides application level management of VNFs and physical network functions (PNFs) and is a producer of the network function (NF) provisioning service that includes configuration management (CM), fault management (FM) and performance management (PM). The NFMF 557 is also a consumer of the NF provisioning service produced by the VNFs and PNFs. The PNF 558 is a network function that is not virtualized, for example a base station. The VNF 559 is any network function that can run on a virtual infrastructure.

The NFV-MANO functions 551 include the network function virtualization orchestrator (NFVO) 552, virtual network function manager (VNFM) 553, and virtualized infrastructure manager (VIM) (554). The NFVO 552 generates, maintains, and tears down network services of VNFs themselves. If there are multiple VNFs, NFVO 552 enables creation of end to end service over multiple VNFs. NFVO 552 is also responsible for global resource management of NFVI resources. For example, managing the NFVI resources, i.e. computing, storage, and networking resources among multiple VIMs in a network. The NFVO 552 performs its functions by not talking directly to VNFs but, through VNFM 553 and VIM 554. The VNFM 553 manages a VNF or multiple VNFs i.e., it does the life cycle management of VNF instances. Life cycle management relates to setting up/maintaining and tearing down VNFs. The VIM 554 is the management system for NFVI. The VIM 554 is responsible for controlling and managing the NFVI computing, network, and storage resources within one operator's infrastructure domain. The VIM 554 is also responsible for collection of performance measurements and events.

The functions 556, 557, 558, and 559 can provide priorities for the subnet slices that can then be enforced by NFV-MANO 551. In a standard approach, the functions 556, 557, 558, and 559 determine a static priority for each slice that is then used by NFV-MANO 551. However, this static priority does not necessarily reflect a desired allocation of network resources at the time of the capacity problem and does not ensure the best use of network resources.

Figure 6:
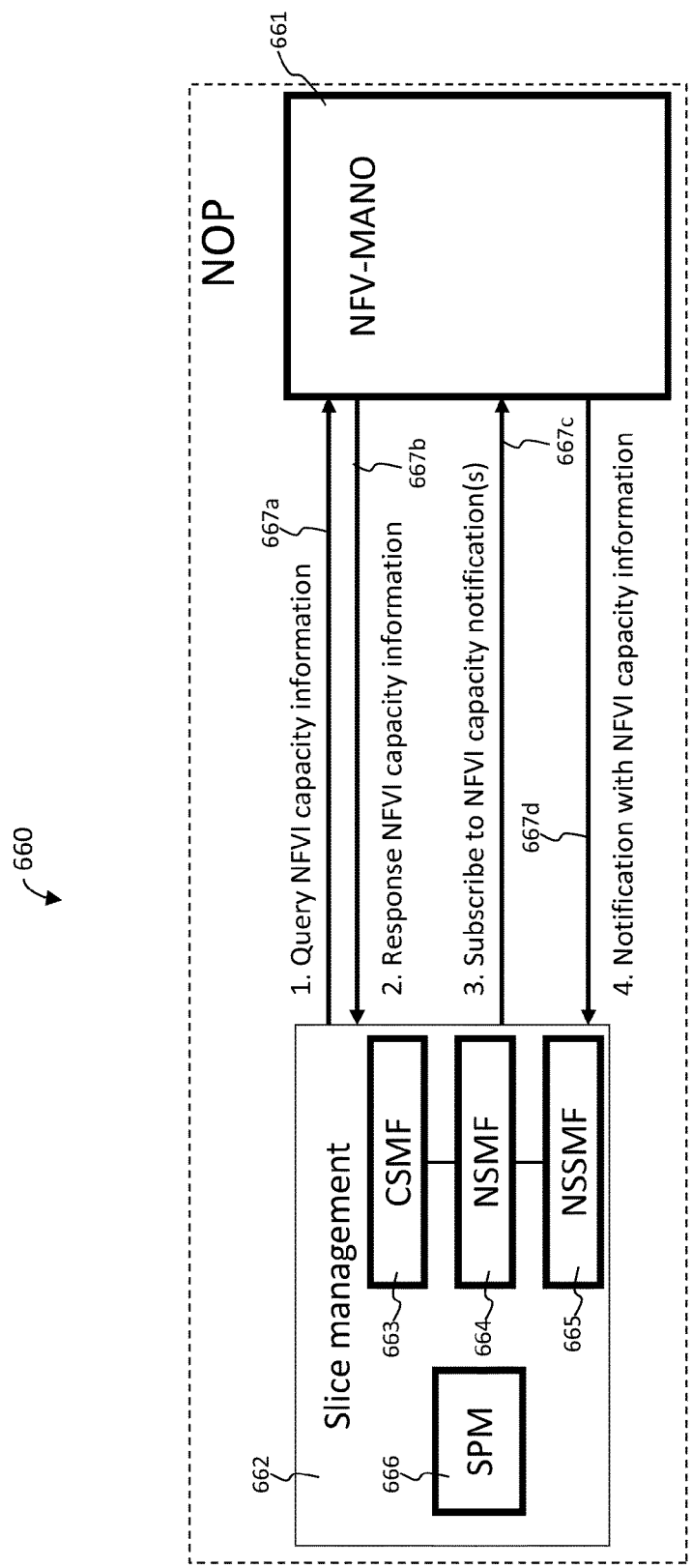
FIG. 6 is a block diagram illustrating capacity information flows that are utilized in embodiments.

Embodiments solve the foregoing problem through use of a slice priority manager function that can be implemented to provide dynamic handling of slice priorities. FIG. 6 illustrates capacity information message flows in a network 660 that may be used in embodiments. In NFV-MANO, the capability to handle priorities for "network services" which map to 3GPP's network subnet slices, is being developed, through a new sub interface in the Os-Ma-nfvo interface. This interface is called the Network Function Virtualization infrastructure (NFVI) Capacity Information interface. The interface allows the capacity information message flows 667a-d to be implemented between the network services node, NFV-MANO 661, and the network node 662 implementing the slice management functions 663-666. It is noted that while the node 662 is depicted including the functions 663-666, embodiments are not so limited, and the node 662 may include any functions as described in 3GPP TR 28.801, "Telecommunication management; Study on management and orchestrations of network slicing for next generation network," 3GPP, January 2018. In FIG. 6, the slice management functions include the communication service management function (CSMF) 663, network slice management function (NSMF) 664, and network slice subnet management function (NSSMF) 665. The CSMF 663 is responsible for translating the communication service requirements to network slice requirements and the CSMF 663 communicates this with the NSMF 664. The NSMF 664 is responsible for management and orchestration of a network slice instance (NSI), translates network slice requirements into network slice subnet requirements and communicates this with the NSSMF 665. The NSSMF 665 is responsible for management and orchestration of a network slice subnet instance (NSSI). The NSSMF 665 can communicate with the NSMF 664.

Further, the node 662 includes slice priority manager (SPM) 666 that may be implemented as a function to implement any embodiments described herein. For instance, the SPM 666 may perform the communications and processing to provide dynamic slice priority handling as described.

Further, the SPM 666, implementing an embodiment, may also communicate with other functions in providing dynamic slice priority handling. For instance, if the SPM 666 determines that a slice needs to be de-instantiated, then the SPM 666 will communicate with the NSMF 664 to get the slice de-instantiated. In another embodiment, if the SPM 666 determines that a subnet slice needs to be de-instantiated, the SPM 666 will communicate with the NSSMF 665. In yet another example embodiment, that utilizes default priorities, the NSMF 664 and NSSMF 665 can ask the SPM 666 for default priorities.

In another instance, the SPM 666 can communicate with the NFV-MANO 661 directly for NFVI capacity information. Similarly, in another embodiment the SPM 666 communicates directly with the NFV-MANO 661 to update the slice priority, computing, storage, or networking resource limits. In yet another embodiment, for updating the slice priority, computing, storage, or networking resource limits, the SPM 666 communicates to the NSSMF 665 and the NSSMF 665 translates these communications and provides them to the NFV-MANO system 661. Further, another embodiment may also implement the various functionalities of the SPM 666 in the NSSMF 665, NSMF 664, and/or CSMF 663, amongst other examples.

The interface between the nodes 662 and 661 provides the following functions: Query NFVI capacity information 667*a*, get a NFVI capacity information response 667*b*, subscribe to NFVI capacity notifications 667*c*, and get NFVI capacity notifications 667*d* when there is capacity shortage or abundance, for example. The messages 667*a* and 667*b* utilize a polling mechanism and the messages 667*c* and 667*d* utilize a subscribe/notify mechanism. In embodiments, both mechanisms can be used.

With the standard static priority approach depicted in FIG. 5, when a network failure in the infrastructure of the mobile operator occurs, complete network slices are turned off or are deleted in order to maintain operation of higher priority network slices. Turning off or deleting complete slices leads to service unavailability for end users that depend on the lower priority slices, which is undesirable. The problem with this static priority approach is that it also turns off slices in situations where turning off slices is not necessary. For example, if the slices that are candidates for removal are, at that time, only used to a fraction of their capacity, the fractionally utilized slices could still be maintained if the currently used capacity is accounted for rather than the nominal capacity. Another example is that the degree of dependence of end users on the slices may vary over time. For instance, end users' needs for the services provided over the slices may vary, for example, because of the availability of alternative services or delivery infrastructure, or because of the varying use of the services over time. With fixed priorities, a slice that carries less important services during the network failure may be maintained at the cost of a slice that provides more important services. The current 3GPP specification does not provide mechanisms to include real-time information on actual use of slice capacity or priorities from third parties and end users in the decisions to de-instantiate slices.

Embodiments of the disclosure solve the problems of static slice priority by making the handling of priority of slices more dynamic, so that the steps taken during network failures can be adapted to the real-time needs of third party service providers and end-users. The dynamic handling of priorities reuses the priorities that are under development in ETSI NFV and which may be used in 3GPP. The dynamic priority handling provided by embodiments is implemented by further real-time analysis carried out by the network slice management functions and/or a newly implemented slice priority management function which utilizes further information provided by third parties on the desired priorities of the third parties' services.

Figure 7:
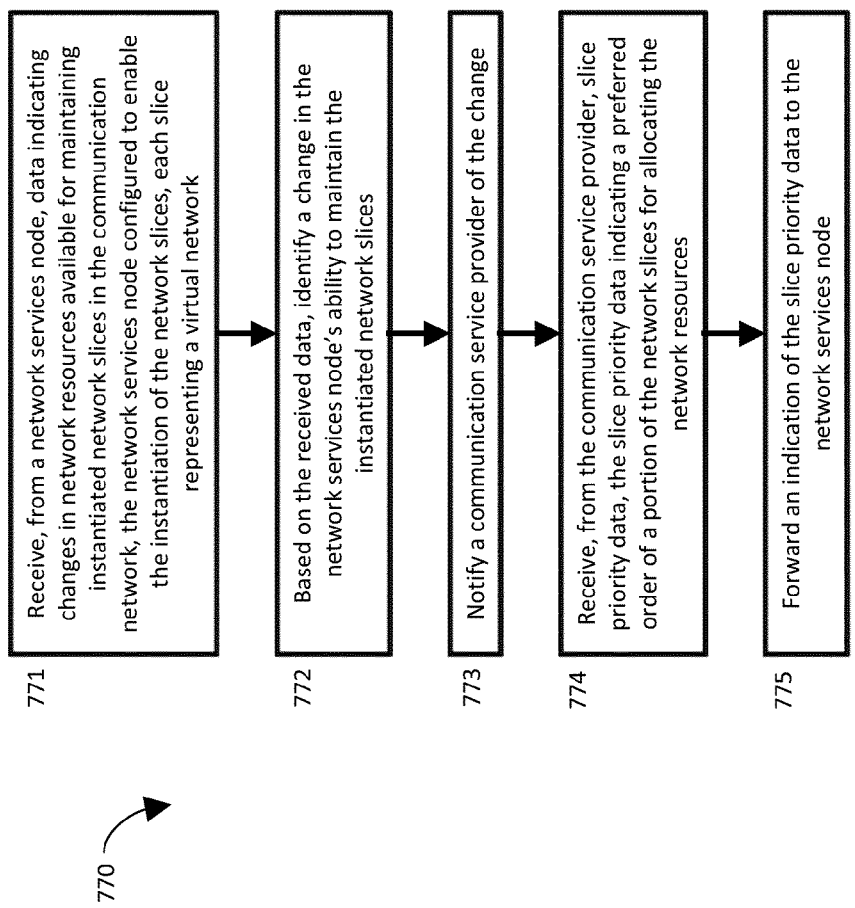
FIG. 7 is a flow diagram of a method for managing network slice priority in an embodiment.

FIG. 7 is a flow chart of a method 770 for providing dynamic slice priority management according to an embodiment. The method 770 may be implemented through any variety of mechanisms in any variety of environments known in the art. The method 770 may be implemented in a network node. Further, the method 770 may be implemented as a network function. For instance, next generation network architectures, such as 5G, may separate network functions from the underlying hardware resources, in the case of a telecommunication network, the network nodes of the network. For that purpose, so-called NV techniques may be used, and in particular NFV techniques which provide network functions that are instantiable in software using the hardware of one or more of the network nodes. Herein, "providing" or "establishing" a network function may thus comprise or refer to the instantiation of the network function in the network.

As described herein, next generation network architectures may further define virtual data planes which separate data traffic in the network. Such virtual data planes, which may be established by a SDN but also by other techniques, may include a management plane to enable transmissions of management data in the network. In an embodiment, the method 770 is implemented as a management plane function operating in the management plane of a network.

In an example embodiment, the method 770 is implemented as a function, e.g., the SPM 666. According to an embodiment, the steps 771-775 of the method 770 are done by the SPM function 666. Further, in other embodiments, communications between the SPM 666 (implementing the method 770) and the NFV-MANO 661 can be via other functions. For instance, a communication can go from the SPM 666 to the CSMF 663, then to the NSMF 664 and then to the NSSMF 665, and then to the NFV-MANO 661. In another embodiment, communication to the NFV-MANO 661 can go from the SPM 666 to the NSMF 664, from the NSMF 664 to the NSSMF 665, and then from the NSSMF 665 to the NFV-MANO 661. In yet another embodiment, a communication goes from the SPM 666 to the NSSMF 665 and then from the NSSMF 665 to the NFV-MANO 661.

In another embodiment wherein, the SPM 666 implements the method 770, when the SPM 666 communicates with a CSP, it goes via the CSMF 663. Further, according to yet another embodiment, when the SPM 666 communicates with a CSP the communications go from the SPM 666 to the NSMF 664 and then from the NSMF 664 to the CSMF 663.

Returning to FIG. 7, the method 770 begins at step 771 by receiving, from a network services node, data indicating changes in network resources available for maintaining instantiated network slices in a communication network. In such an embodiment, the network services node is configured to enable the instantiation of the network slices that each represent a virtual network. According to an embodiment, the data received at step 771 indicates a lack of resources for maintaining the instantiated network slices or an abundance of resources for maintaining the instantiated network slices. In an example embodiment, the data is received at step 771 in response to a push from the network services node. In another embodiment, the data is received at step 771 in response to a request from a network node to the network services node.

According to an embodiment, the network services node from which the data is received at step 771 is a NFV-MANO node. Further, while embodiments are described as being implemented in a communication network with a NFV-MANO node, embodiments are not so limited and may be implemented in any communication network with slicing. While data is received at step 771 from a network services node, an alternative embodiment of the method 770 also includes receiving data indicating available network resources from a transport network system.

The method 770 continues at step 772 by identifying a change in the network services node's ability to maintain the instantiated network slices based on the received data. In turn, at step 773, a communication service provider is notified of the change in the network services node's ability to maintain the instantiated network slice. In an embodiment, the communication service provider is notified of the change at step 773 via an exposure function.

Next, at step 774 slice priority data is received from the communication service provider. Thus, in such an embodiment, the communication service provider determines a preferred order for maintaining instantiated slices and communicates data indicating the preferred priority. In an embodiment, the slice priority data received at step 774 indicates a preferred order of a portion of the network slices for allocating the network resources. Further, in an embodiment, the slice priority data also includes preferred changes or priorities for allocating resources to the various services, e.g., storage, processing, and connectivity, provided by slices. According to an embodiment, the "portion" of network slices includes slices associated with the communication service provider.

Finally, at step 775 an indication of the slice priority data is forwarded to the network services node. In this way, the network services node can modify allocation of network resources for maintaining instantiated network slices in accordance with the communication service provider's preferences. According to an embodiment, the indication of the slice priority data includes the slice priority data and/or instructions to remove a given network slice of the instantiated network slices.

In an alternative embodiment of the method 770, in response to receiving the slice priority data from the communication service provider at step 774, the method includes determining if changing allocation of network resources based on the slice priority data corrects a resource problem. Then, if changing the allocation of network resources based on the slice priority data does not correct the resource problem, the communication service provider is notified so that that communication service provider can attempt to determine a slice priority configuration that corrects the resource problem. In such an embodiment, the method may determine if changing allocation of the network resources based on the slice priority data corrects the resource problem based upon at least one of: connectivity capacity data, storage capacity data, and processing capacity data. According to an embodiment, the connectivity capacity data, the storage capacity data, and the processing capacity data may each have a base capacity, maximum guaranteed capacity, and maximum non-guaranteed capacity.

An alternative embodiment of the method 770, at step 772, identifies a change in the network services node's ability to maintain instantiated slices on a slice by slice basis. In this way, the method 770 may identify that there are insufficient resources available to maintain a slice associated with an individual communication service provider. Then, at step 773, the communication service provider is only notified of the change in the network services node's ability to maintain the instantiated network slices if it is determined there are insufficient resources available to maintain a slice associated with the communication service provider. In this way, a communication service provider is not needlessly notified of a change. According to an embodiment, the method 770 determines there are insufficient resources available to maintain the slice associated with the communication service provider based upon connectivity capacity data, storage capacity data, and/or processing capacity data. In such an embodiment, the connectivity capacity data, the storage capacity data, and the processing capacity data may each include a base capacity data, maximum guaranteed capacity data, and maximum non-guaranteed capacity data.

Another embodiment of the method 770 is configured to provide dynamic slice handling for a plurality of communication service providers. In such an embodiment, multiple communication service providers are notified of the change in the network services node's ability to maintain the instantiated slices. According to an embodiment, only the communication service providers who have slices affected by the change in resources are notified. In turn, slice priority data is received from each communication service provider. The slice priority data indicates a preferred order for allocating resources to network slices associated with each respective communication service provider. Then, an indication of the slice priority data received from each communication service provider is forwarded to the network services node. In an alternative embodiment, prior to forwarding the data to the network services node, it is determined if changing the allocation of network resources based on the slice priority received from the multiple communication service providers corrects a resource problem. Then, if changing the allocation of network resources based on the slice priority data received from the multiple communication service providers does not correct the resource problem, the multiple communication service providers are notified so that the communication service providers can provide updated slice priority data in an attempt to overcome the problem.

In an embodiment of the method 770, in notifying the communication service provider of the change at step 773, the method also includes indicating an order with which slices associated with the communication service provider will be allocated resources by the network services node. According to an embodiment, in indicating the order with which slices associated with the communication service provider will be allocated resources by the network services node, the method indicates the order using a mapping that numerically decouples priority indicators used by the network services node from priority indicators used by the communication service provider.

It is noted that the method 770 may also include the functionality of any embodiments described herein, such as the functionality described herein in relation to FIGS. 6 and 8-16. Likewise, the other embodiments described herein may implement any of the embodiments of the method 770 described hereinabove.

Figure 8:
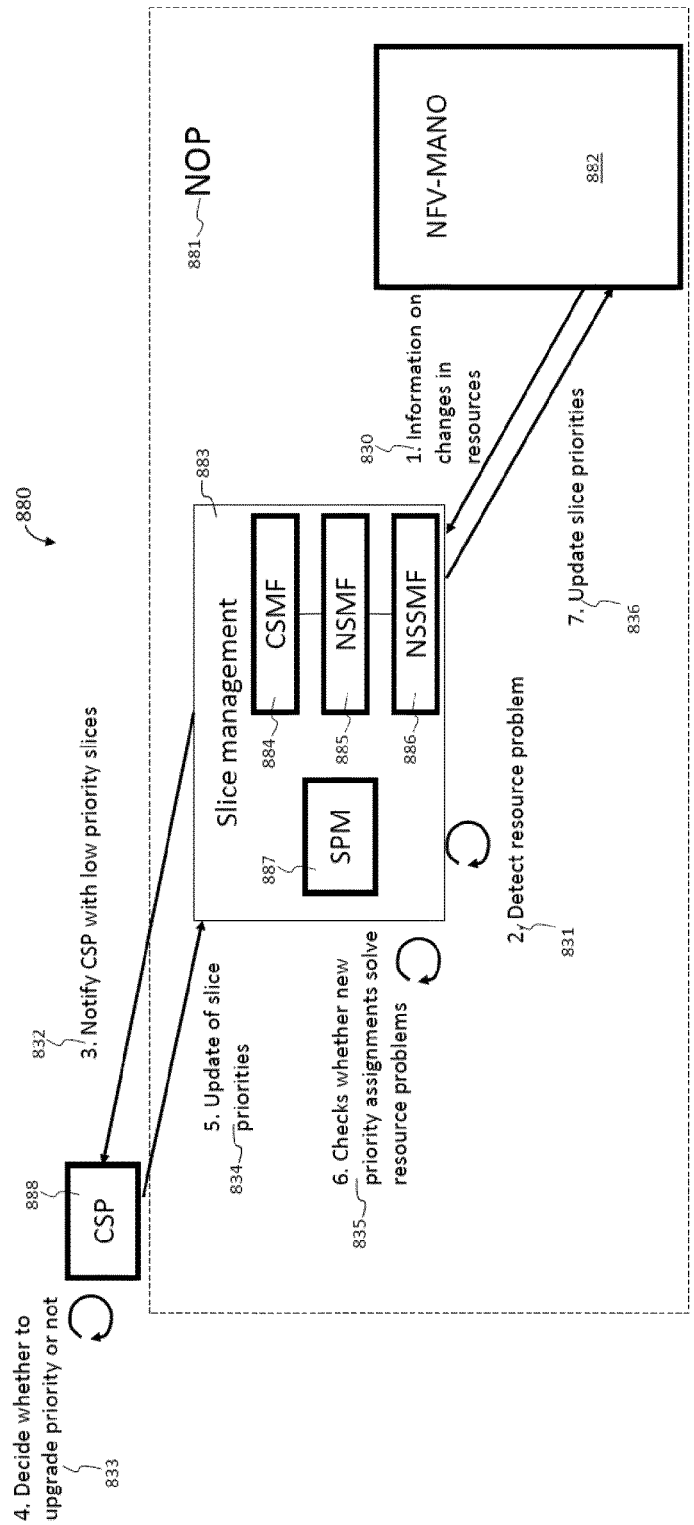
FIG. 8 is a block diagram depicting dynamic handling of slice priorities according to an embodiment.

FIG. 8 depicts dynamic handling of slice priorities in a network 880 according to an embodiment. The mobile network 880 is managed by a Network Operator (NOP) 881 that has set up multiple slices in the mobile network 880. The slices are used for services offered by several Communication Service Providers (CSPs), such as the CSP 888, which in general are $3^{rd}$ parties. The NOP 881 can itself also be a CSP. The slices are managed by the NOP 881. The NOP 881 can also let a CSP handle parts of the management functions by giving the CSP access to the management functions through an Exposure Function (EF) (not shown). The network 880 also includes a slice management function 883 that includes the CSMF 884, NSMF 885, NSSMF 886, and SPM 887. It is noted that while in FIG. 8, and the other figures described herein, e.g., FIGS. 9-11, the slice management function is depicted as including the CSMF, NSMF, NSSMF, and SPM, embodiments are not so limited and the slice management function/system can comprise other logical functional blocks. For instance, embodiments may be implemented in any slice management system that provides services including: configuration management (CM), fault management (FM), performance management (PM), and life cycle management (LCM) for VNFs and network slices.

According to an embodiment, when slices are created a Network Service Descriptor (NSD) information element is sent from the 3GPP Slice Management system 883 to the NFV-MANO system 882. This information element contains an initial/default priority value. The handling of slices with different priorities is managed by the NFV-MANO system 882 and is not currently in the 3GPP scope. However, in the network 880, slice priority values can be set and be updated by the 3GPP Slice Management system 883.

Each slice has a capacity in the areas of connectivity, storage, and processing, and each area (connectivity, storage, and processing) of capacity can be characterized by one or more parameters. These parameters may include a minimum/base capacity (that is always reserved for the slice), a maximum that is guaranteed to be achievable, and a headroom capacity that may be available if the total network resources allow. The 3GPP Slice Management system 883 can retrieve information about current resource usage from the NFV-MANO system 882. The current resource usage data may include information related to memory, storage, CPU usage, network capacity, radio capacity, and other resource information.

In the network 880 new functionality for dynamic slice priority management is provided that is bundled in the SPM functional box 887. This function 887 can comprise smaller functionalities and these smaller functionalities can also be provided by micro services. In embodiments, these functionalities can be co-located with other functionalities and are not necessarily grouped physically or virtually together. This means that the complete or parts of the functionality that comprise the SPM function 887 can be implemented on a Services Based Architecture (SBA) by one or more different management services. This is also the case for the Exposure Function (EF) and other functions that are described herein.

In general, the network 880 operates in normal operation, i.e. without network failures or resource shortages and then when a resource problem occurs, the NFV-MANO system 882 sends 830 information to the slice management function 887 regarding changes in available resources. Further, according to an embodiment, thresholds may be set for when the NFV-MANO 882 sends 830 information to the slice management function 887. In an embodiment, the NFV-MANO system 882 may send the information using messages as described hereinabove in relation to FIG. 6. The SPM 887 analyzes 831 whether the change in resources causes problems in maintaining network slices. If it is determined that there are problems in maintaining network resources, the CSP 888 is notified 832 by the SPM 887 via an application program interface (API). In an alternative embodiment, the SPM 887 does not perform the analysis 831 and the information regarding changes in resources is sent to CSPs. Further, in an embodiment, a CSP may only be notified if the change in resources affects a slice that is utilized by the CSP.

Further, it is noted that while only a single CSP 888 is depicted, the network 880 may include a plurality of CSPs and then, the SPM function 887 may provide dynamic slice priority services for the plurality of CSPs. Moreover, in an embodiment, only the CSPs with the low-priority slices that are candidates for removal are informed. However, embodiments are not so limited and CSPs may always be informed of changes in available resources.

To continue, upon receiving notification of the change in resources, the CSP 888 determines 833 a preferred action. Possible actions include changing, i.e., upgrading or downgrading, the priority of slices and decreasing the current minimal capacity for slices. In an embodiment, the capacity may refer to capacity for processing, storage, and connectivity provided by a slice. Next, the CSP 888 communicates 834 its determined preferences to the SPM 887. The SPM 887 checks 835 whether the new modification by the CSP 888 solves the resource problems. If not, then the steps 832, 833, 834, and 835 are executed again. In an embodiment, the steps 832, 833, 834, and 835 are repeated only for affected low priority slices.

Further, in another embodiment, there is a predetermined maximum for the number of iterations. In such an embodiment, the predetermined maximum number of iterations may be a property set for the SPM 887. When the maximum number of iterations is reached, in an embodiment, the SPM 887 will stop the iterations and communicate the latest priority changes and resource allocation changes to the NFV-MANO 882. In such an embodiment, the NFV-MANO 882 will determine how to proceed and may de-instantiate a slice to allow higher priority slices to continue to function. In another embodiment, iterations may be stopped prior to reaching a maximum number, but when the same slice priority data or resource allocation changes are received from the same CSP as in a previous iteration. In that case, the SPM 887 communicates the latest priority changes and resource allocation changes to the NFV-MANO 882. In another embodiment, where there are multiple CSPs, iterations may still continue even where a CSP provides the same priority and resource allocation changes for multiple iterations so as to allow other CSPs to modify their priority and resource allocation changes.

If it is determined 835, that the new configuration solves the resource problems, the slice priorities will be updated 836 by sending the priorities to the NFV-MANO node 882. In an embodiment, the SPM 887 and the slice management system 883 will forward the updated slice priority information via the Os-Ma-nfvo interface to the NFV-MANO node 882. Upon receipt of the updated priorities, the NFV-MANO node 882 can enforce the priorities, e.g., allocate resources for maintaining instantiated slices based on the updated priorities.

The SPM function 887 is configured to implement the dynamic slice priority handling. In an embodiment, the SPM function 887 detects resource problems, based on information obtained from the NFV-MANO system 882. Further, the SPM function 887 communicates with the CSP 888 that uses the various slices directly, through new messages. The SPM 887 can also check if the newly assigned slice properties or capacities will solve the resource problems and can make decisions on the adjustment of priorities, based on the (updated) priorities from multiple CSPs.

Figure 9:
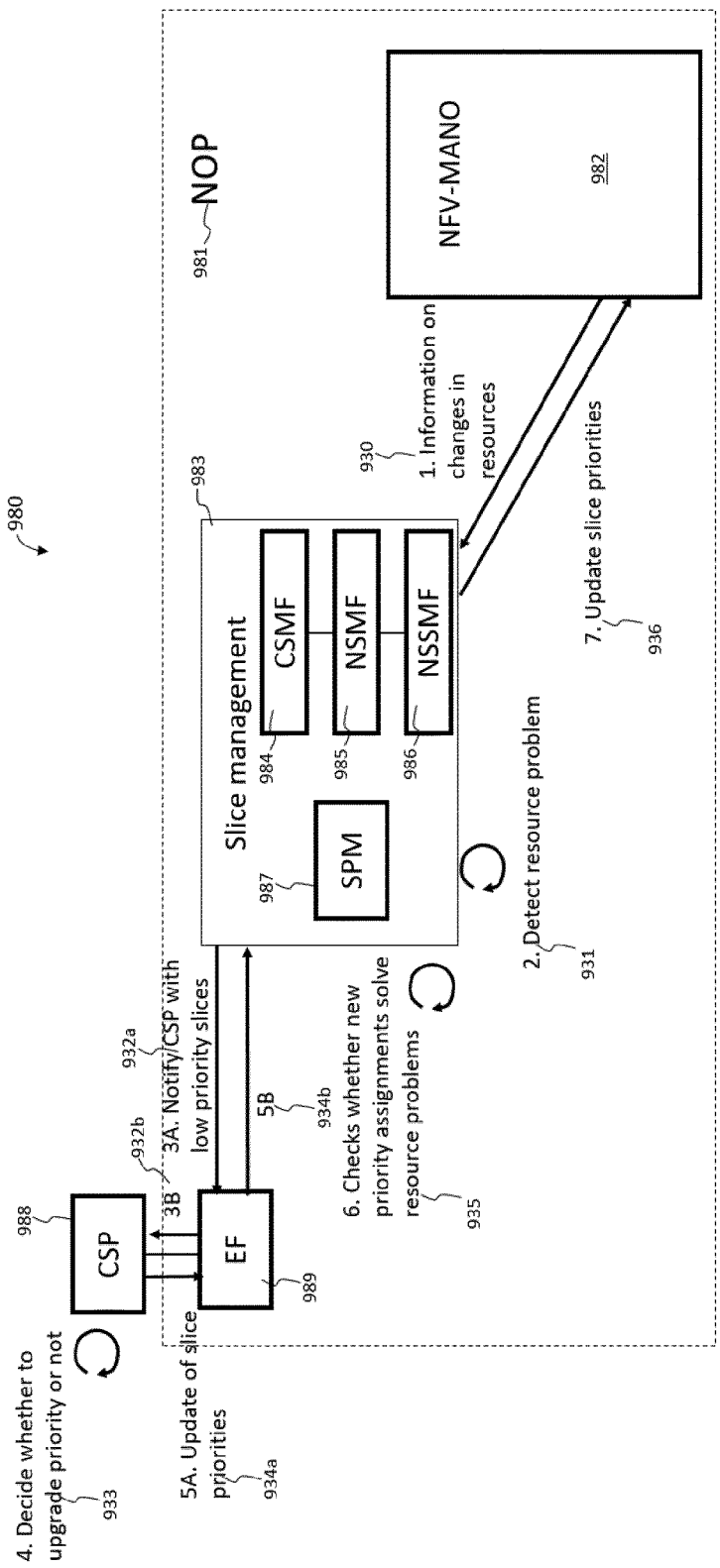
FIG. 9 illustrates an embodiment of dynamic handling of slice priorities through an exposure function.

FIG. 9 illustrates an embodiment of dynamic handling of slice priorities through an exposure function 989. The mobile network 980 is managed by a NOP 981 that has set up multiple slices in the mobile network 980. The network 980 includes a slice management function 983 that includes the CSMF 984, NSMF 985, NSSMF 986, and SPM 987. The SPM 987 communicates with the CSP 988 via the exposure function 989.

During operation, when a resource problem occurs, the NFV-MANO system 982 sends 930 information to the slice management function 983 regarding changes in available resources. The SPM 987 analyzes 931 whether the change in resources causes problems in maintaining network slices. If it is determined that there are problems in maintaining network slices, the SPM 987 notifies 932*a* the exposure function 989 and the exposure function 989 sends 932*b* the message to the CSP 988 that there are problems in maintaining network slices. Upon receiving notification of the change in resources, the CSP 988 determines 933 a preferred action. Then, the CSP 988 communicates 934*a* its determined preferences to the exposure function 989 and the exposure 989 provides 934*b* the CSP's 988 preferences to the SPM 987. The SPM 987 checks 935 whether modifications preferred by the CSP 988 solves the resource problem. If not, then the steps 932*a-b*, 933, 934*a-b*, and 935 are executed again. If it is determined 935 that the new configuration solves the resource problem, the slice priorities will be updated and the slice management system 983 forwards 936 the updated slice priority information to the NFV-MANO node 982.

In the network 980, the communication between the slice management node 983 and the CSP 988 in steps 932*a-b* and 934*a-b* is established via the intermediate exposure function 989. Thus, the communication flows between the slice management node 983 and CSP 988 are split into the steps 932*a* and 932*b* and the steps 934*a* and 934*b*. The exposure function 989 can filter and secure the information coming to the NOP 981 domain from the external/outside CSP 988 domain and may translate or convert the information from the CSP.

Figure 10:
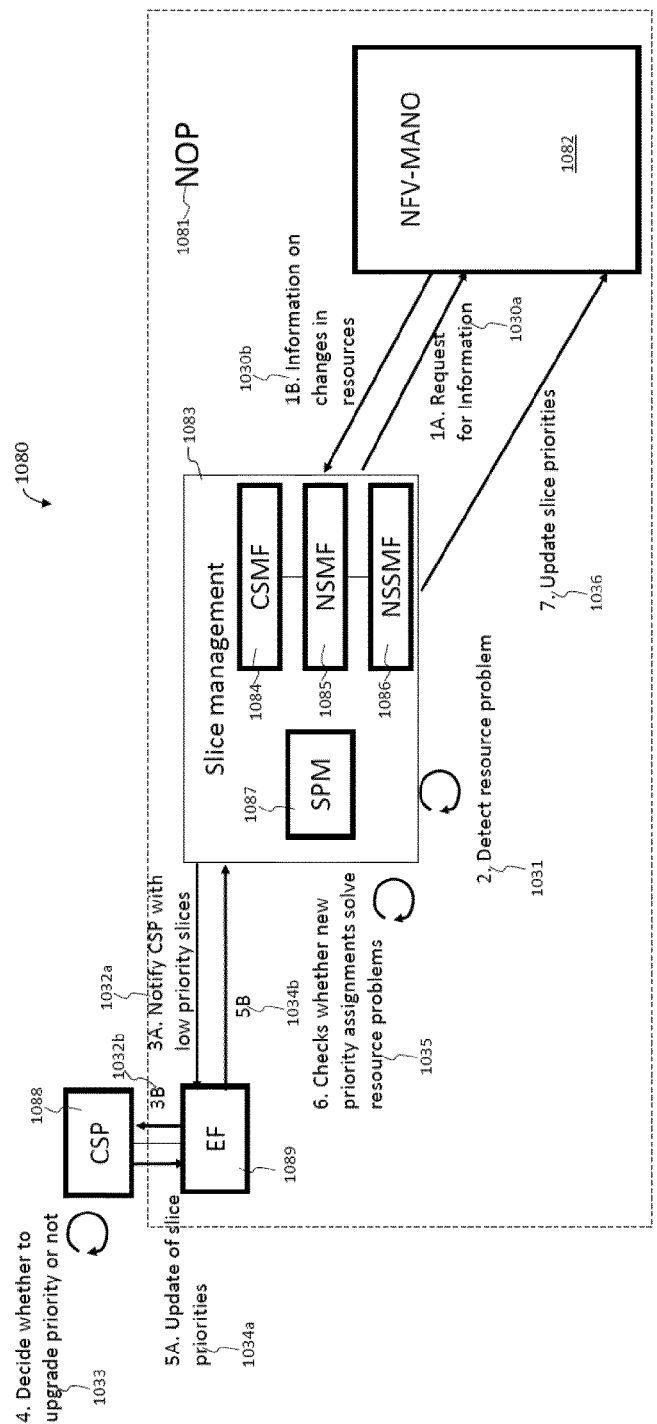
FIG. 10 depicts an embodiment for handling slice priorities by pulling information on changes in network resources.

FIG. 10 depicts a network 1080 that implements slice priority handling by pulling information on changes in network resources. The mobile network 1080 is managed by a NOP 1081 that has set up multiple slices in the mobile network 1080. The network 1080 includes a slice management function 1083 that includes the CSMF 1084, NSMF 1085, NSSMF 1086, and SPM 1087. The SPM 1087 communicates with the CSP 1088 via the exposure function 1089.

In the network 1080, instead of the NFV-MANO node 1082 taking the initiative to inform the slice management node 1083 of changes regarding available resources as in the networks 880 and 980 described herein, the information is requested (pulled) 1030*a* by the slice management node 1083. In embodiments, the resource information may be requested 1030*a* periodically or may be triggered by other events detected by the slice management node 1083.

To illustrate, according to periodic scheduling, or in response to a triggered event, the slice management node 1083 requests 1030*a* information from the NFV-MANO node 1082. In response, the NFV-MANO system 1082 sends 1030*b* information to the slice management node 1083 regarding changes in available resources. The SPM 1087 analyzes 1031 whether the change in resources causes problems in maintaining network slices. If it is determined that there are problems in maintaining network resources, the SPM 1087 notifies 1032*a* the exposure function 1089 and the exposure function 1089 sends 1032*b* the message to the CSP 1088 that there are problems in maintaining network slices. Upon receiving notification of the change in resources, the CSP 1088 determines 1033 a preferred action. Then, the CSP 1088 communicates 1034*a* its determined preferences to the exposure function 1089 and the exposure function 1089 provides 1034*b* the CSP's 1088 preferences to the SPM 1087. The SPM 1087 checks 1035 whether the modification by the CSP 1088 solves the resource problems. If not, then the steps 1032*a-b*, 1033, 1034*a-b*, and 1035 are executed again. If it is determined 1035 that the new configuration solves the resource problems, the slice priorities will be updated by the SPM 1087 and the slice management system 1083 forwards 1036 the updated slice priority information to the NFV-MANO node 1082. It is noted that while the network 1080 is depicted communicating between the slice management node 1083 and the CSP 1088 via the exposure function 1089, the network 1080 is not limited to such a configuration and the slice management node 1083 and CSP 1088 may communicate directly.

Figure 11:
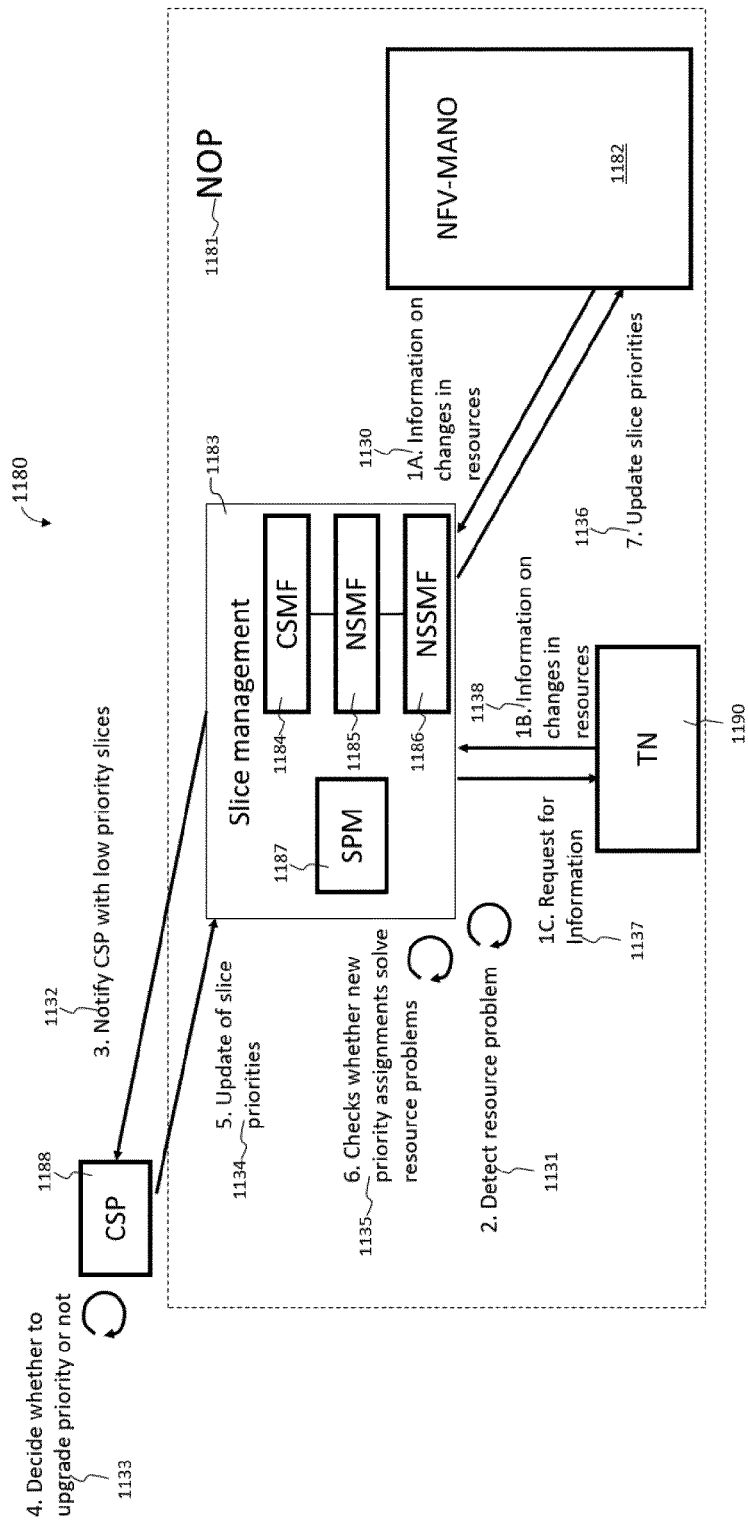
FIG. 11 is a block diagram of an embodiment providing dynamic slice priority management using information exchanged with a transport network.

FIG. 11 is a block diagram of an embodiment that provides dynamic slice priority management using information exchanged with a transport network 1190. The mobile network 1180 is managed by a NOP 1181 that has set up multiple slices in the mobile network 1180. The network 1180 includes a slice management function 1183 that includes the CSMF 1184, NSMF 1185, NSSMF 1186, and SPM 1187. The network 1180 also includes the CSP 1088 and transport network 1190.

In the network 1180, instead of getting capacity or resource usage information solely from the NFV-MANO system 1182 information is also retrieved directly from a transport network system 1190. The transport network system 1190 can be a management system of network equipment, e.g., a firewall, a router, and/or a switch, or a Software Defined Network (SDN) system or any other transport network system that can provide network equipment capacity information or resource usage data. The network 1180 is depicted using a polling mechanism to obtain data from the transport network 1190, however, embodiments are not so limited and a push mechanism where the transport network 1190 notifies the slice management node 1183 of changes regarding available resources may also be used. Further, while not depicted, the network 1180 may also employ an exposure function as described herein. Further still, while FIG. 11 illustrates the slice management node 1183 receiving resource information from the NFV-MANO node 1182, in an alternative embodiment, the information regarding changes in resources may only be received from the transport network 1190.

In operation, according to periodic scheduling, or in response to a triggered event, the slice management node 1183 requests 1137, information from the transport network node 1190 and, in response, the transport network node 1190 sends 1138 information on changes in resources to the slice management node 1183. Likewise, the NFV-MANO node 1182 sends 1130 information on changes in resources to the slice management node 1183. The SPM 1187 analyzes 1131, using the information from the transport network 1190 and NFV-MANO node 1182, whether the change in resources causes problems in maintaining network slices. If it is determined that there are problems in maintaining network slices, the SPM 1187 notifies 1132 the CSP 1188 that there are problems in maintaining network slices. Upon receiving notification of the change in resources, the CSP 1188 determines 1133 a preferred action. Then, the CSP 1188 communicates 1134 its determined preferences to the SPM 1187. The SPM 1187 checks 1135 whether the new modification by the CSP 1188 solves the resource problems. If not, then the steps 1132, 1133, 1134, and 1135 are executed again. If it is determined 1135 that the new configuration solves the resource problems, the slice priorities will be updated 1136 by the SPM 1187 and the slice management system 1183 forwards the updated slice priority information to the NFV-MANO node 1182.

It is noted that any features described herein may be implemented in any of the embodiments described herein, limited only by features that are incompatible. Further, features, e.g., an exposure function, push and polling information exchange, and receiving information from a transport network, may be used in any of the embodiments described herein, including the method 770 and the networks 880, 980, 1080, and 1180, amongst others.

As described herein, in an embodiment a CSP, e.g., the CSP 888, is only notified of changes in the network service's nodes ability to maintain an instantiated slice if the failing slice is associated with, e.g., used by, the CSP. However, in an alternative embodiment, instead of involving only CSPs with low priority slices, CSPs that have higher priority slices can also be notified about changes in resource availability. In such an embodiment, the CSP associated with a higher priority slice, e.g., a slice that is not affected by the change in resource availability, is notified. In such an embodiment, the notified CSP determines a change in slice priority or needed slice capacity, and forwards the updated preferences to the slice priority manager. The message to the CSP with high priority slices can include a request to lower the guaranteed maxima for the resources in the CSP's associated slice(s). Then, the message back to the slice priority management function can include an information element specifying a new maximum determined by the CSP. By notifying CSPs associated with slices that are not affected by the change in resources, the slice priority management function can free up network resources for other slices. Similarly, in embodiments, CSPs may be notified when there is also an abundance of resources and in this way, CSPs can modify a preferred slice priority or modify capacity requirements to free-up network resources so that other slices can be instantiated or additional resources can be provided to other slices.

Figure 12:
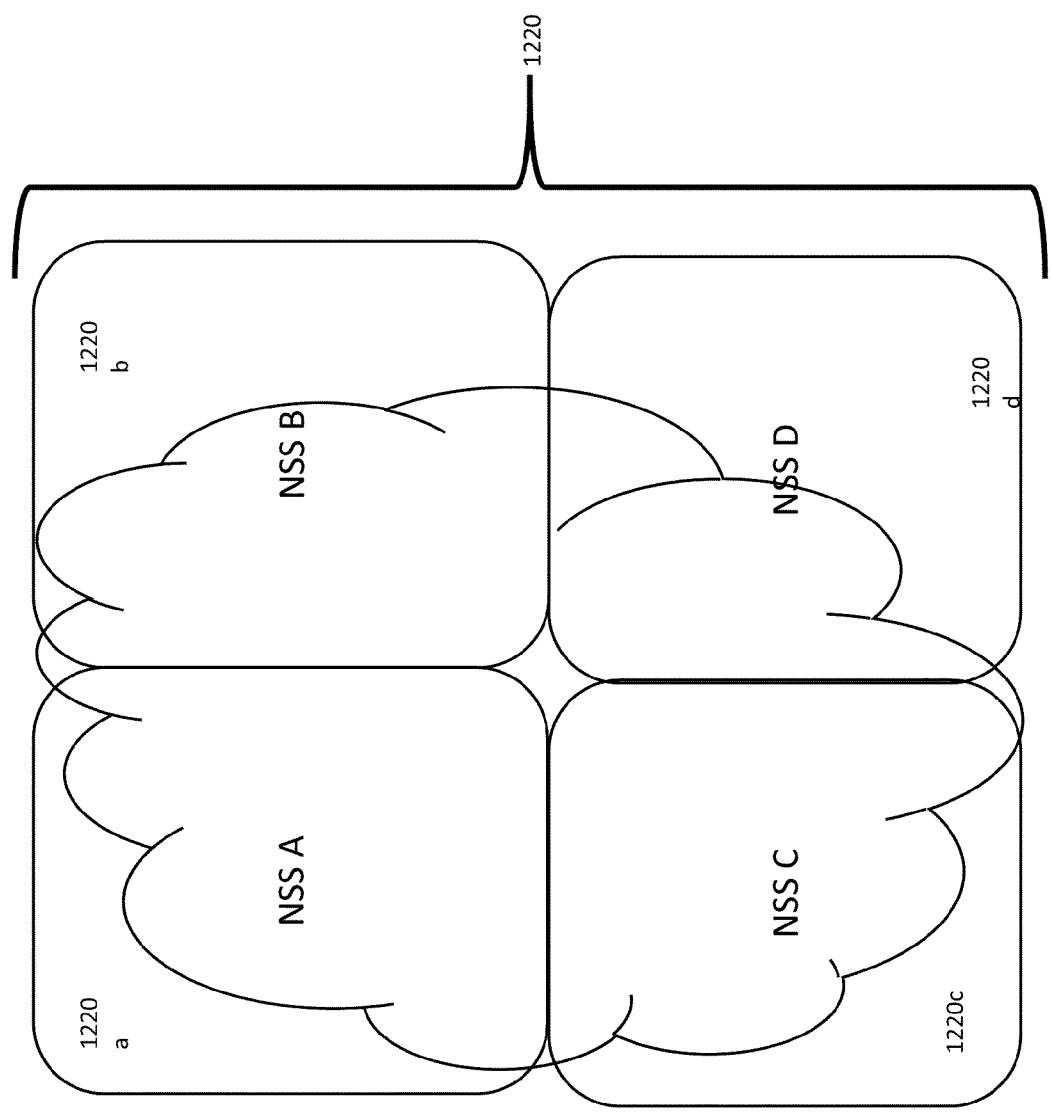
FIG. 12 depicts slice subnets that may be managed according to embodiments.

Another embodiment provides slice priority management with finer granularity than the network slice level. In such an embodiment, priority management may be controlled for different geographic areas or network segments, i.e., subnet slices. In such an embodiment, instead of modifying a complete slice which is located over a large geographical area, only subnet slices are modified in the case of a local capacity or resource problem. Thus, if a problem occurs in a certain area which is geographically covered by a network slice subnet, slice management, e.g., a slice management function or node implementing slice management, only takes action for this specific subnet. FIG. 12 depicts a slice 1220 and the slice subnets 1220*a-d* that may be managed according to embodiments.

In such an embodiment, subnet slice identifiers or geographic information is added to messages. The subnet slice identifiers indicate affected subnet slices and likewise, the geographic information indicates the affected geographic area. In an example embodiment, the data indicating changes in network resources available for maintaining instantiated network slices includes location information or subnet slice identifiers. The location information and subnet slice identifiers indicate changes in network resources available to maintain instantiated subnet slices forming the network slices. The location information or subnet slice identifiers are provided to the CSP and the CSP provides subnet slice priority data indicating a preferred priority for providing network resources to subnet slices or geographic locations. In turn, the subnet slice priority data is provided to the network services node. Such an embodiment may also include determining if modifying network resource allocation according to the subnet slice priority data corrects a resource problem and, if not, notifying the CSP.

An example embodiment provides CSPs with an indication of the order with which slices will be allocated resources. In one such embodiment, the CSP is notified of the actual order amongst all of the instantiated slices with which the CSP's associated slices will be allocated resources. To illustrate, consider an example where there are four slices, referred to as slice-1, slice-2, slice-3, and slice 4, and slice-3 and slice-4 are associated with a CSP. In the network, slice-3 and slice-4 are priority 3 and 4 respectively. In an embodiment where the CSP is made aware of its associated slices' actual priority, the CSP will be told that slice-3 is priority 3 and slice-4 is priority 4.

In an alternative embodiment, a mapping is used between CSP internal priorities and priorities used in slice management. The priorities that CSPs use internally can be decoupled numerically from the priorities used in slice management, e.g., a node implementing embodiments described herein. To illustrate, returning to the example with slice-1, slice-2, slice-3, and slice-4. If the indications of slice priority are numerically decoupled, the CSP will be notified that slice-3 is priority 1 and slice-4 is priority 2. In this way, the CSP is only notified of the order with which its associated slices will be allocated resources but, the CSP is not notified of the priority of its associated slices as compared to other slices in the network.

The advantage of this numeric decoupling is that CSPs are not bound to use the external priorities from slice management in their internal systems that may use other ordering or depend on yet other external priority lists as well. Table 1 below illustrates an example of how two sets of priorities can be mapped. In Table 1, the internal priorities column indicates the priority with which CSP X's slices are allocated resources compared only to the slices associated with communication service provider X. The slice management priorities column indicates the priority with which CSP X's slices will be allocated resources compared to all of the slices in the network.

TABLE 1

| Internal priorities CSP X | Slice management priorities |
|---|---|
| 1 | 2 |
| 2 | 4 |
| 3 | 7 |

In an embodiment, the numeric decoupling can be implemented by an exposure function, e.g., exposure function 989, or can be done by the slice priority manager, e.g., slice priority manager 987. In another embodiment, the mapping from internal CSP priorities and slice management priorities and back is done by the CSP itself when determining how to change priority, e.g., at step 833, or in an (additional) intermediate step in the communications between the CSP and the slice manager.

As described herein, in an embodiment, the slice priority management function, e.g., the SPM 887 described hereinabove in relation to FIG. 8, determines whether changing priorities and/or the allocation of resources according to updates received from the CSP correct the resource allocation problem. In an embodiment, this decision making by the SPM is based on various types of information that the SPM receives from the CSP. For example, the CSP may indicate various measures for the capacity for the connectivity, storage, and processing functionality of a slice that the CSP wishes to have available in the CSP's slice. The capacity can be expressed in a combination of the base capacity, capacity that is always reserved for the slice, a (higher) maximum guaranteed capacity, capacity that is always made available to the slice upon request by the CSP, and an additional headroom capacity, capacity that may be made available if the total network resources and resources used by other slices permits. As an option, these measures may also be geographically or network-topology dependent. As another option, these measures may be defined to vary in time in a predetermined way. The CSP can include the various capacity values and their further specification in the messages exchanged between the CSP and the slice priority manager. Further, the CSP may also indicate preferences, e.g., priorities that vary over time, as the availability of resources varies over time. Further, the slice priority manager can receive the inputs for these measures from different CSPs and then use the inputs from multiple CSPs to decide on the optimal way to account for a lack of resources between the slices from different CSPs. As an output of the decision, the slice priority manager may send new values of the measures back to the CSPs if the original changes do not correct the resource problem.

Further, in embodiments, the information received from the network services node may also include details regarding changes to the various capacity levels of each individual slice. For instance, information may indicate changes in base capacity, maximum guaranteed capacity, and additional headroom for the functionalities, e.g., storage, processing, and connectivity, for slices.

Figure 13:
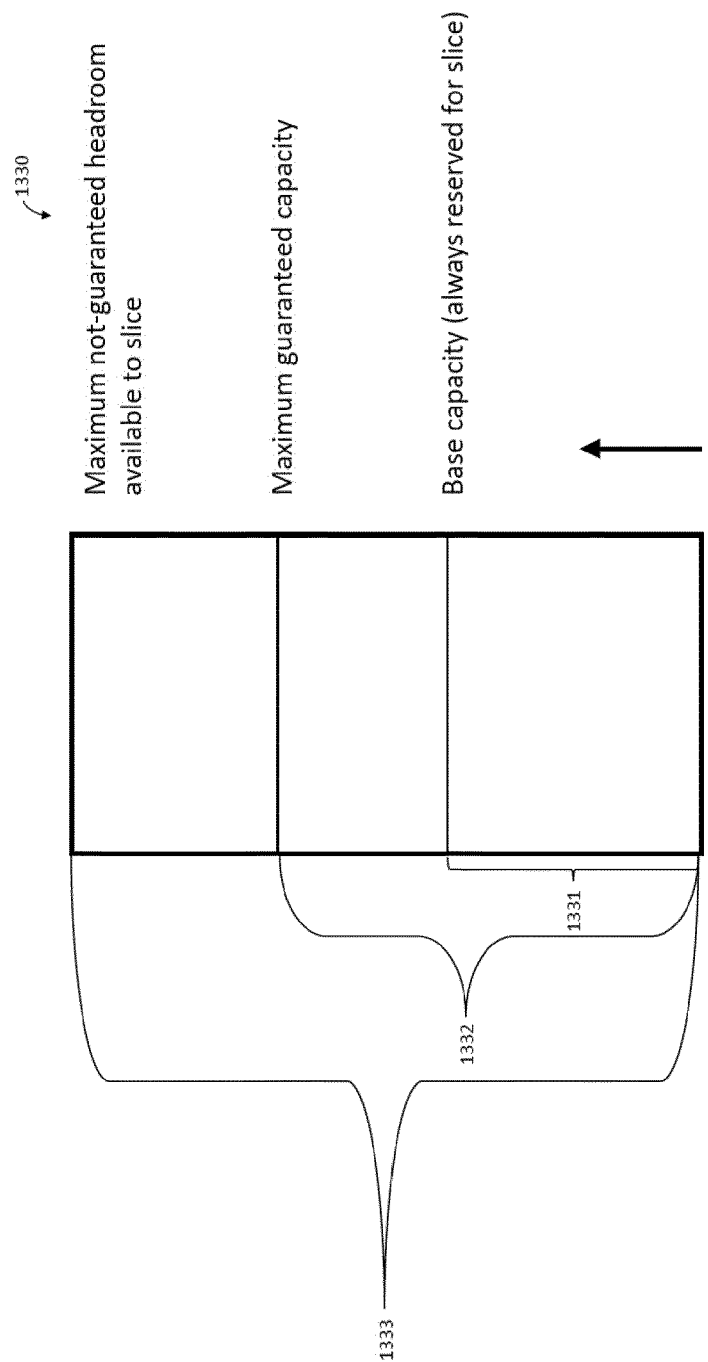
FIG. 13 illustrates resource capacities that may be employed in providing dynamic slice priorities according embodiments.

FIG. 13 illustrates capacities 1331-1333 for a given resource 1330 that may be employed in providing dynamic priorities as described herein. In FIG. 13, the resource 1330 is has three capacity levels, a base capacity 1331 that is always reserved for a slice, maximum guaranteed capacity 1332 (which encompasses the base capacity 1331) that is always available to the slice upon request, and an additional headroom capacity 1333 (which encompasses the base capacity 1331 and maximum guaranteed capacity 1332) that may be made available if the total network resources allow. Thus, FIG. 13 illustrates the capacity levels for a resource, e.g., connectivity, for a slice. The slice likewise has the three capacity levels for the other resources the slice provides, e.g., processing and storage.

Another embodiment uses default parameters for changes in resources, e.g., a shortage of resources or an abundance of resources. In such an embodiment, instead of the information exchange and real-time CSP input, the slice priority manager may fall back on predetermined defaults for a CSP for the CSP's preferred priorities and guaranteed capacity. This fall back may be employed if the CSP is not responsive to the notification of the change regarding the ability to maintain an instantiated slice. This may occur, for example, because of the resource shortage. In one such embodiment, default parameter values are stored for each CSP by the slice manager. The default values may be taken from preferences provided by the CSP during an earlier situation with resource shortages. The default values may also be determined based on other online or offline interactions between the CSP and the slice manager. In such an embodiment, the default values are provided to the network services nodes as if the default values had been provided in real-time as in other embodiments described herein.

Yet another embodiment creates slice priority proposals that are provided to the CSPs. Instead of only notifying the CSP of capacity or resource problems, the slice priority manager creates a proposal for the CSP on how to change priorities or how to change specific slice parameters, e.g., processing, storage, or transport. This proposal can be created from several sources, including historical data (how the CSP responded in past situations), current resource usage (the slice priority manager detects that the CSP could have the same quality of service (QoS) with different slice parameters), or a machine learning algorithm (based on historical data, current data, and predicting future traffic patterns). The use of machine learning may operate using a neural network trained with historical data to predict preferences based on network conditions.

These extra functionalities can be performed by the slice priority manager prior to notifying the CSP of the change in network resources. Then, the proposal can be sent when the CSP is notified of the changes in the network services node's ability to maintain the instantiated network slices. In an embodiment, the CSP can respond positively or negatively to the proposal and can also ask for capacity information if this was not already provided. If, however, the CSP does not agree with the proposal, then the CSP can provide its own priority preferences as described herein.

In another embodiment, the CSP is prompted to provide a new priority preference when there is not a change in the network services node's ability to maintain instantiated slices. In such an embodiment, the CSP may be prompted periodically or in response to any other desired triggering event.

Figure 14:
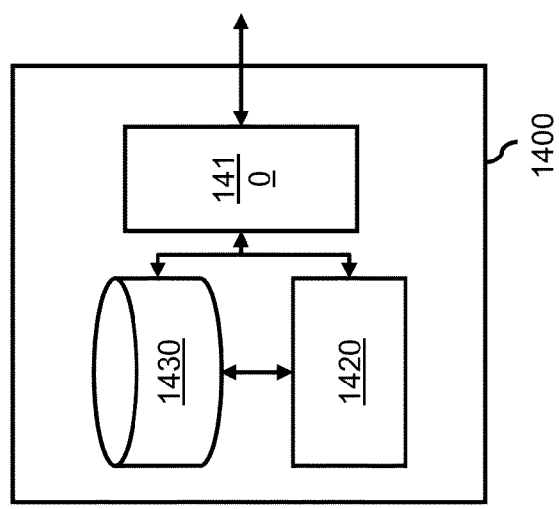
FIG. 14 shows a system which may represent a network node implementing a slice management function according to an embodiment.

FIG. 14 shows a system 1400 which may represent a network node implementing a slice management function according to an embodiment. It can be seen that the system 1400 may comprise a network interface 1410 for communicating with (other) network nodes in the network. The network interface 1410 may take any suitable form, including but not limited to, a wired network interface based on Ethernet or optical fiber or a wireless network interface. FIG. 14 further shows the system 1400 comprising storage 1430, such as a hard disk, a solid-state drive, or an array thereof, which may be used by the system 1400 for storing data.

The system 1400 may further comprise a processor 1420 which may be configured, e.g., by hardware design or software, to perform the operations for providing dynamic slice priority functionality described herein. For example, the processor 1420 may be embodied by a single Central Processing Unit (CPU), but also be a combination or system of such CPUs and/or other types of processing units. In general, the system 1400 may be embodied by a (single) device or apparatus, e.g., a network server. However, the system 1400 may also be embodied by a distributed system of such devices or apparatuses.

In general, the dynamic slice priority management functionality described herein may be implemented at least in part by a device or apparatus. The device or apparatus may comprise one or more (micro)processors which execute appropriate software. Software implementing the functionality described herein may have been downloaded and/or stored in a corresponding memory or memories, e.g., in volatile memory such as RAM or in non-volatile memory such as Flash. Alternatively, the methods and systems described herein may be implemented in the device or apparatus in the form of programmable logic, e.g., as a Field-Programmable Gate Array (FPGA). In general, a function may be implemented as a circuit.

Figure 15:
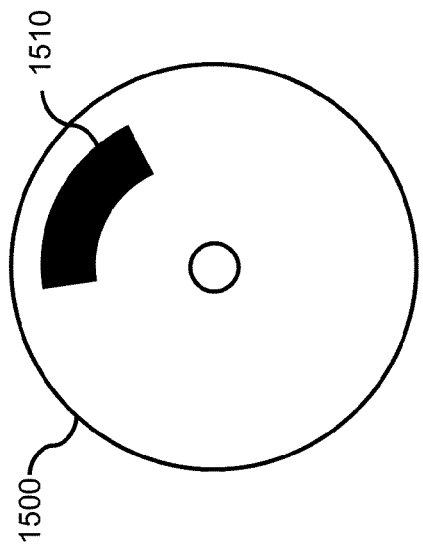
FIG. 15 depicts a computer readable medium comprising non-transitory data comprising instructions for causing a processor system to perform an embodiment.

FIG. 15 depicts a computer readable medium comprising non-transitory data comprising instructions for causing a processor system to perform an embodiment. It is noted that any of the methods described herein, for example in any of the claims, may be implemented on a computer as a computer implemented method, as dedicated hardware, or as a combination of both. Instructions for the computer, e.g., executable code, may be stored on a computer readable medium 1500 as for example shown in FIG. 15, e.g., in the form of a series 1510 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 15 shows by way of example an optical storage device 1500.

Figure 16:
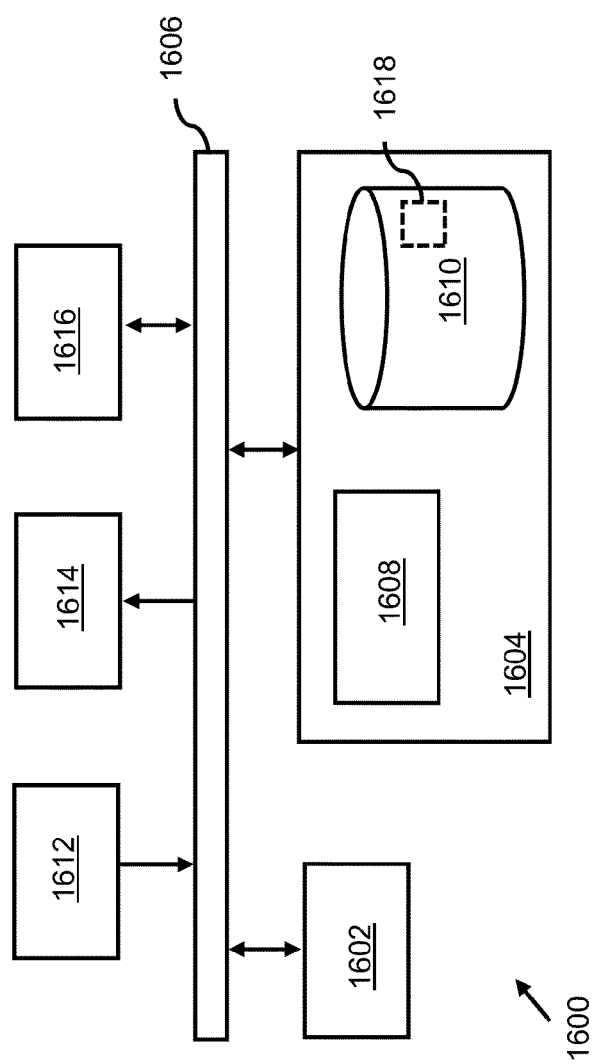
FIG. 16 is a block diagram of an exemplary data processing system that may be used to implement an embodiment.

FIG. 16 is a block diagram of an exemplary data processing system 1600 that may be used to implement an embodiment. Such data processing systems include data processing entities described in this specification, including but not limited to data processing entities implementing the embodiments described herein, such as the method 770.

The data processing system 1600 may include at least one processor 1602 coupled to memory elements 1604 through a system bus 1606. As such, the data processing system 1600 may store program code within memory elements 1604. Further, processor 1602 may execute the program code accessed from memory elements 1604 via system bus 1606. In one aspect, data processing system 1600 may be implemented as a computer that is suitable for storing and/or executing program code. It should be appreciated, however, that data processing system 1600 may be implemented in the form of any system including a processor and memory that can perform the functions described herein.

Memory elements 1604 may include one or more physical memory devices such as, for example, local memory 1608 and one or more bulk storage devices 1610. Local memory may refer to random access memory or other non-persistent memory device(s) generally used during actual execution of the program code. A bulk storage device may be implemented as a hard drive, solid state disk, or other persistent data storage device. The processing system 1600 may also include one or more cache memories (not shown) that provide temporary storage of at least some program code in order to reduce the number of times program code must be retrieved from the bulk storage device 1610 during execution.

Input/output (I/O) devices depicted as input device 1612 and output device 1614 optionally can be coupled to the data processing system 1600. Examples of input devices may include, but are not limited to, for example, a microphone, a keyboard, a pointing device such as a mouse, a game controller, a Bluetooth controller, a VR controller, and a gesture based input device, or the like. Examples of output devices may include, but are not limited to, for example, a monitor or display, speakers, or the like. Input device 1612 and/or output device 1614 may be coupled to data processing system 1600 either directly or through intervening I/O controllers. A network adapter 1616 may also be coupled to the data processing system 1600 to enable the data processing system 1600 to become coupled to other systems, computer systems, remote network devices, and/or remote storage devices through intervening private or public networks. The network adapter 1616 may comprise a data receiver for receiving data that is transmitted by said systems, devices and/or networks and a data transmitter for transmitting data to said systems, devices and/or networks. Modems, cable modems, and Ethernet cards are examples of different types of network adapters that may be used with data processing system 1600.

As shown in FIG. 16, memory elements 1604 may store an application 1618. It should be appreciated that data processing system 1600 may further execute an operating system (not shown) that can facilitate execution of the application 1618. The application 1618, being implemented in the form of executable program code, can be executed by data processing system 16000, e.g., by processor 1602. Responsive to executing the application 1618, the data processing system 1600 may be configured to perform one or more operations described herein.

In one aspect, for example, data processing system 1600 may implement the dynamic slice priority management functionality described herein. In that case, application 1618 may represent an application that, when executed, configures data processing system 1600 to perform the functionality described herein.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

While example embodiments have been particularly shown and described, it will be understood by those skilled in the art that various changes in form and details may be made therein without departing from the scope of the embodiments encompassed by the appended claims.

The invention claimed is:

1. A network node configured as a slice priority management node for use with a communication network, the network node configured to:
  receive, from a network services node, data indicating changes in network resources available for maintaining instantiated network slices in the communication network, the network services node configured to enable the instantiation of the network slices, each slice representing a virtual network;
  based on the received data, identify a change in the network services node's ability to maintain the instantiated network slices;
  notify a communication service provider of the change;
  receive, from the communication service provider, slice priority data, the slice priority data indicating a preferred order of a portion of the network slices for allocating the network resources; and
  forward an indication of the slice priority data to the network services node.

2. The network node according to claim 1 wherein the data received from the network services node indicates a lack of resources for maintaining the instantiated network slices or an abundance of resources for maintaining the instantiated network slices.

3. The network node according to claim 1 further configured, in response to receiving the slice priority data from the communication service provider, to:
  determine if changing allocation of network resources based on the slice priority data corrects a resource problem; and
  if changing the allocation of network resources based on the slice priority data does not correct the resource problem, notify the communication service provider.

4. The network node according to claim 1 wherein the data indicating changes in network resources is pushed to the network node from the network services node or received in response to a request from the network node to the network services node.

5. The network node according to claim 1 further configured to:
  in identifying a change in the network services node's ability to maintain the instantiated network slices, determine there are insufficient resources available to maintain a slice associated with the communication service provider; and
  only notify the communication service provider of the change in the network services node's ability to maintain the instantiated network slices if it is determined there are insufficient resources available to maintain the slice associated with the communication service provider.

6. The network node according to claim 1 wherein the data indicating changes in network resources available for maintaining instantiated network slices includes location information or subnet slice identifiers, where the location information and subnet slice identifiers indicate changes in network resources available to maintain instantiated subnet slices forming the network slices, and the network node is further configured to:
  provide the location information or the subnet slice identifiers to the communication service provider;
  receive subnet slice priority data from the communication service provider; and
  forward an indication of the subnet slice priority data to the network services node.

7. The network node according to claim 1 where, in notifying the communication service provider of the change, the network node is configured to:
  indicate an order with which slices associated with the communication service provider will be allocated resources by the network services node.

8. The network node of claim 7 wherein, in indicating an order with which slices associated with the communication service provider will be allocated resources by the network services node, the network node is configured to:
  indicate the order using a mapping that numerically decouples priority indicators used by the network services node from priority indicators used by the communication service provider.

9. The network node according to claim 1 of the preceding claims further configured to:
  store default slice priority data associated with the communication service provider; and
  forward the default slice priority data to the network services node if the slice priority data is not received from the communication service provider.

10. The network node according to claim 1 of the preceding claims further configured to:
  determine a proposed slice priority; and
  provide the proposed slice priority to the communication service provider.

11. The network node according to claim 1 wherein the communication service provider is a first communication service provider and the portion of network slices is a first portion of network slices and the network node is further configured to:
  notify a second communication service provider of the change;
  receive, from the second communication service provider, slice priority data, the slice priority data received from the second communication service provider indicating a preferred order of a second portion of the network slices for allocating the network resources; and
  forward an indication of the slice priority data received from the second communication service provider to the network services node.

12. The network node according to claim 11 further configured to:
  determine if changing allocation of network resources based on the slice priority data received from the first communication service provider and the slice priority data received from the second communication service provider corrects a resource problem; and
  if changing the allocation of network resources based on the slice priority data received from the first communication service provider and the slice priority data received from the second communication service provider does not correct the resource problem, notify the first communication service provider and the second communication service provider.

13. A communication network comprising a plurality of network nodes and configured to enable instantiation of network slices which represent virtual networks, the communication network comprising:
  a slice priority management function configured to:
    receive, from a network services node, data indicating changes in network resources available for maintaining instantiated network slices in the communication network, the network services node configured to enable the instantiation of the network slices, each slice representing a virtual network;

based on the received data, identify a change in the network services node's ability to maintain the instantiated network slices;

notify a communication service provider of the change;

receive, from the communication service provider, slice priority data, the slice priority data indicating a preferred order of a portion of the network slices for allocating the network resources; and forward an indication of the slice priority data to the network services node.

14. A method for managing slice priority in a communication network, the method comprising:

receiving, from a network services node, data indicating changes in network resources available for maintaining instantiated network slices in the communication network, the network services node configured to enable the instantiation of the network slices, each slice representing a virtual network;

based on the received data, identifying a change in the network services node's ability to maintain the instantiated network slices;

notifying a communication service provider of the change;

receiving, from the communication service provider, slice priority data, the slice priority data indicating a preferred order of a portion of the network slices for allocating the network resources; and forwarding an indication of the slice priority data to the network services node.

15. A non-transitory computer readable medium comprising a computer program, the computer program comprising instructions for causing a processor system to:

receive, from a network services node, data indicating changes in network resources available for maintaining instantiated network slices in the communication network, the network services node configured to enable the instantiation of the network slices, each slice representing a virtual network;

based on the received data, identify a change in the network services node's ability to maintain the instantiated network slices;

notify a communication service provider of the change;

receive, from the communication service provider, slice priority data, the slice priority data indicating a preferred order of a portion of the network slices for allocating the network resources; and forward an indication of the slice priority data to the network services node.

* * * * *

UNITED STATES PATENT AND TRADEMARK OFFICE
CERTIFICATE OF CORRECTION

PATENT NO. : 11,470,620 B2
APPLICATION NO. : 17/281529
DATED : October 11, 2022
INVENTOR(S) : Wieger IJntema and Pieter Nooren It is certified that error appears in the above-identified patent and that said Letters Patent is hereby corrected as shown below:

In the Claims

In Claim 9, Column 24, Lines 18-19, delete "claim 1 of the preceding claims further" and insert -- claim 1 further --.

In Claim 10, Column 24, Lines 25-26, delete "claim 1 of the preceding claims further" and insert -- claim 1 further --.

Signed and Sealed this
Twentieth Day of December, 2022

Katherine Kelly Vidal
*Director of the United States Patent and Trademark Office*